United States Patent [19]
Yasuda et al.

[11] Patent Number: 5,744,775
[45] Date of Patent: Apr. 28, 1998

[54] WIRE ELECTRODE DISCHARGE MACHINE AND METHOD

[75] Inventors: Osamu Yasuda; Yoshiro Nakayama, both of Tokyo, Japan

[73] Assignee: Mitsubishi Denki Kabushiki Kaisha, Tokyo, Japan

[21] Appl. No.: 611,810

[22] Filed: Mar. 6, 1996

[30] Foreign Application Priority Data

Mar. 6, 1995 [JP] Japan .................... 7-045429

[51] Int. Cl.⁶ .................................................. B23H 7/06
[52] U.S. Cl. .............................................. 219/69.12
[58] Field of Search ................................. 219/69.12

[56] References Cited

U.S. PATENT DOCUMENTS

| | | | |
|---|---|---|---|
| 4,329,558 | 5/1982 | Martin | 219/69.12 |
| 4,499,359 | 2/1985 | Obara | 219/69.12 |
| 4,652,717 | 3/1987 | Brifford et al. | 219/69.12 |
| 4,675,491 | 6/1987 | Marendaz | 219/69.12 |
| 4,703,146 | 10/1987 | Kinoshita | 219/69.12 |
| 4,801,779 | 1/1989 | Obara | 219/69.12 |
| 4,806,720 | 2/1989 | Obara | 219/69.12 |
| 4,931,614 | 6/1990 | Sumita | 219/69.12 |
| 4,963,711 | 10/1990 | Obara | 219/69.12 |
| 5,003,147 | 3/1991 | Kawanabe et al. | 219/69.12 |
| 5,019,684 | 5/1991 | Ito | 219/69.12 |
| 5,306,888 | 4/1994 | Kaneko et al. | 219/69.12 |
| 5,306,889 | 4/1994 | Kaneko et al. | 219/69.12 |

FOREIGN PATENT DOCUMENTS

| | | |
|---|---|---|
| 58-94930 | 6/1983 | Japan . |
| A-5894930 | 6/1983 | Japan . |
| 63-53623 | 4/1988 | Japan . |
| 63-139617 | 6/1988 | Japan . |
| 63-191516 | 8/1988 | Japan . |
| 63-288626 | 11/1988 | Japan . |
| 1-103229 | 4/1989 | Japan . |
| 1-306132 | 12/1989 | Japan . |
| 3-35941 | 2/1991 | Japan . |
| 5-200627 | 8/1993 | Japan . |

*Primary Examiner*—Geoffrey S. Evans
*Attorney, Agent, or Firm*—Sughrue, Mion, Zinn, Macpeak & Seas, PLLC

[57] ABSTRACT

To easily correct the slant of a wire electrode to a workpiece by using the workpiece which is machined into a product and the wire electrode without a special jig. Discharge is generated by approaching a wire electrode 1 to a workpiece fixed on a table. The slant of the wire electrode and correcting amount are calculated by measuring the discharge for a prescribed period of time or a prescribed number of times, while taking the discharge position as a width or a distribution. Then, correction is performed. Therefore, it is possible to correct the slant of the wire electrode relative to the workpiece directly by using the wire electrode. Accordingly, it is possible to drastically reduce the time necessary for getting accuracy in fixing the workpiece on the table and the time necessary for arrangements such as verticality check of the wire electrode by discharge.

21 Claims, 17 Drawing Sheets

Voltage waveform

Current waveform

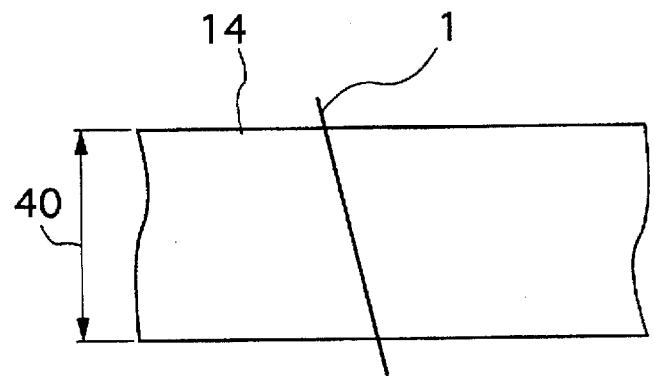
FIG.17a
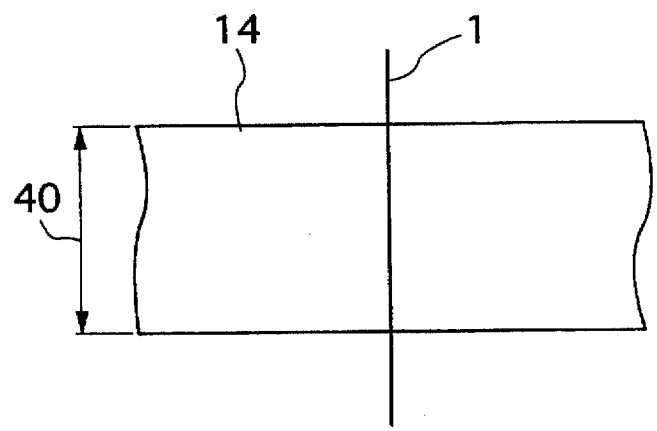
FIG.17b
FIG.17c
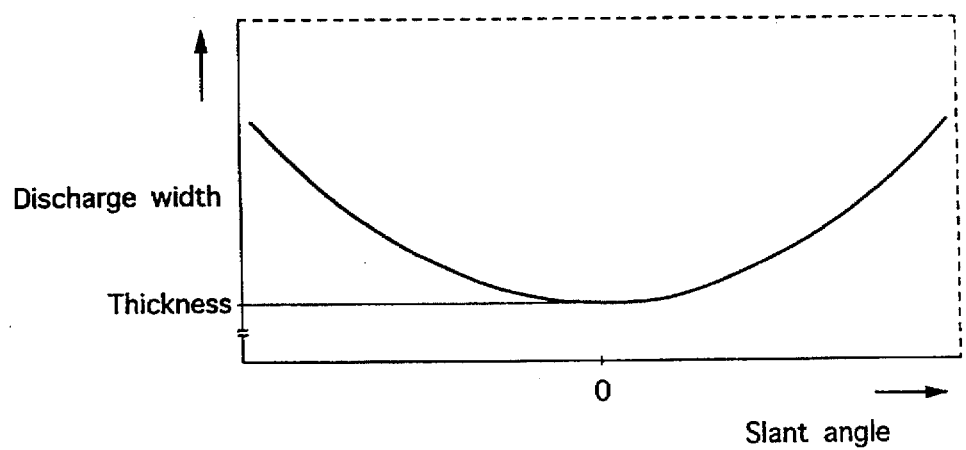

WIRE ELECTRODE DISCHARGE MACHINE AND METHOD

BACKGROUND OF THE INVENTION

The present invention relates to a wire electrode discharge machine and method for electric discharge machining with a wire electrode. More specifically, the invention relates to a wire electrode discharge machine and method for detecting the slant angle of a wire electrode relative to a workpiece so as to correct undesired slant.

Japanese Laid-Open Patent Publication No. 58-94930 discloses a wire electrode discharge machine mechanism and method in which slant of a wire electrode relative to a table on which a workpiece is fixed is corrected indirectly through the table.

Referring to FIG. 19, the method for correcting the slant of the wire electrode relative to the table which is disclosed in the above-mentioned publication will be described.

In FIG. 19, reference numeral 1 is a wire electrode, 2 is a table on which the workpiece is fixed, 3 is an upper wire electrode guide, 4 is a lower wire electrode guide, 5 is an X-axis motor which moves the table 2 in the X-axis direction, 6 is a Y-axis motor which moves the table 2 in the Y-axis direction, 7 is a U-axis motor which moves the upper wire electrode guide 3 in the U-axis direction, 8 is a V-axis motor which moves the upper wire electrode guide 3 in the V-axis direction, 9 is a table control means which controls the movement of the table 2 in the X-axis and Y-axis directions by driving the X-axis motor 5 and the Y-axis motor 6, 10 is taper control means which controls the movement of the upper wire electrode guide 3 in the U-axis and V-axis direction by driving the U-axis motor 7 and the V-axis motor 8, 11 is a position detecting means which makes the wire electrode 1 contact with the workpiece and detects the contact point of the electrode and workpiece, 12 is a rectangular jig which corrects the slant of the wire electrode 1 relative to the table 2, 13 is a verticality detecting means which detects the contact condition between the rectangular jig 12 and the wire electrode 1, and 25 is an NC unit which controls the table control means 9 and the taper control means 10 based on prescribed programs or a manual operation.

FIGS. 20a and 20b are structural drawings which show details of the rectangular jig 12 of FIG. 19. FIG. 20a is a front view of the rectangular jig 12, and FIG. 20b is a bottom end view of the rectangular jig 12.

In FIG. 20a, 30 shows an upper contact detecting plate, 31 is a lower contact detecting plate, and 32 is an insulator which is interposed between the upper contact detecting plate 30 and lower contact detecting plate 31 to insulate them each other. Contacts of the upper side and the lower side of the electrode 1 are detected by the upper contact detecting plate 30 and the lower contact detecting plate 31, respectively. 33 is an upper signal wire for transmitting a signal, which is generated when the wire electrode 1 comes into contact with the upper contact detecting plate 30, to the slant detecting means 13. Reference numeral 34 is a lower signal wire for transmitting a signal, which is generated when the wire electrode 1 comes into contact with the lower contact detector 31, to the verticality detecting means 13. 30a and 30b are X-axis direction contact parts which are provided on the upper contact detecting plate 30 and the lower contact detecting plate 31, respectively. Reference numerals 31a and 31b are Y-axis direction contact parts which are provided on the upper contact detecting plate 30 and the lower contact detecting plate 31, respectively.

The operation of this arrangement will be described hereinafter.

In FIG. 19, the wire electrode 1 is guided by the upper wire electrode guide 3 and the lower wire electrode guide 4. The upper wire electrode guide 3 is movable, and the lower wire electrode guide 4 is fixed. In order to give the slant to the wire electrode 1, the upper wire electrode guide 3 is moved by driving the U-axis motor 7 in the U-axis direction or the V-axis motor 8 in the V-axis direction. The rectangular jig 12 is fixed on the table 2. The table 2 is moved by driving the X-axis motor 5 in the X-axis direction or the Y-axis motor 6 in the Y-axis direction.

An operation to correct rectangularity of the wire electrode 1 relative to the table 2 is described hereafter.

The wire electrode 1 is moved toward the rectangular jig 12 by shifting the table 2. When further advancing the table, the wire electrode 1 is not at right angles to the table 2, the wire electrode 1 touches either the upper contact detecting plate 30 or the lower contact detecting plate 31 of the rectangular jig 12. For instance, when the wire electrode 1 touches the upper contact detecting plate 30, the table 2 is moved back by a certain distance from the rectangular jig 12, and then the upper wire electrode guide 3 is slanted at a certain degree in a direction apart from the rectangular jig 12 by driving the U-axis motor 7 or V-axis motor 8. Again, the wire electrode 1 is moved toward the rectangular jig 12 by shifting the table 2. If the wire electrode 1 still touches only the upper contact detecting plate 30 of the rectangular jig 12, the above-mentioned operation is repeated until the wire electrode 1 simultaneously touches both the upper contact detecting plate 30 and the lower contact detecting plate 31 of the rectangular jig 12. By these processes, the wire electrode 1 comes to be vertical against the table 2.

On the other hand, if the wire electrode 1 touches the lower contact detecting plate 31 of the rectangular jig 12 at first, the table 2 is moved back by a certain distance from the rectangular jig 12. Then, the upper wire electrode guide 3 is slanted at a certain degree so as to come close to the rectangular jig 12 by driving the U-axis motor 7 or V-axis motor 8. Again, the wire electrode 1 is moved toward the rectangular jig 12 by shifting the table 2. If the wire electrode 1 still touches the lower contact detecting plate 31 of the rectangular jig 12 at first, the above-mentioned operation is repeated until the wire electrode 1 simultaneously touches both the upper contact detecting plate 30 and the lower contact detecting plate 31 of the rectangular jig 12. By these processes, the wire electrode 1 comes to be vertical against the table 2.

As described above, the process for correcting the slant of the wire electrode relative to the table while using the electric discharge is manually effected. In order to obtain a stable discharge for correcting the slant, it is necessary to generate a discharge not in the air but in a fluid. Since it is impossible for an operator to visually check the condition of discharge with the electrode immersed in water, the operator must check the discharge position with the electrode sprayed with water by upper and lower nozzles. The fluid flow makes it difficult to check precisely the discharge position, and expertise is required to correct the slant.

In addition, the wire electrode discharge machine is a precision machine which requires submicron accuracy, so that the slant of the wire electrode reltative to the workpiece fixed on the table directly affects machining accuracy. Therefore, it is essential to keep the wire electrode vertical with respect to the workpiece fixed on the table to achieve the desired machining accuracy. In the wire electrode discharge machine, as mentioned above, a specific jig is necessary to correct the slant of the wire electrode relative to the table. However, a problem with the jig is that the upper and lower contact detecting plates thereof are individually worn by electrolytic corrosion, in proportion to utilized frequency, so that precise correction of the slant of the wire relative to the table becomes difficult.

Moreover, the jig may be fixed on the table inadvertently in an inclined state at the time of fixing the workpiece, so that it takes time to adjust the jig correctly on the table. Further, if the jig is fixed on the table even in the machining operation, the accuracy thereof is possibly affected by the machining. Therefore, it is required to fix the jig on the table only at the time of correcting the slant of the wire relative to the table.

It is possible to automate the correcting operation for making the wire electrode vertical to the table. However, the preparations therefor or for the above jig setting workpiece cannot be automated, so that extra time is required. Moreover, mounting error or the like is apt to take place, thereby causing deterioration in the accuracy of the finished products.

A method is known to correct the slant of the wire electrode relative to the workpiece by use of a minute discharge. However, this method must be performed by manual operation, needs expertise for precise correction, and takes considerable time. Thus, it is far from practical use, except for the high accuracy machining carried out by a skilled operator.

Accordingly, the present invention has been made to solve the above problems, and an object thereof is to provide an improved wire electrode discharge machine and method which makes it easy to correct the slant of a wire electrode relative to a workpiece without a specific jig, by using the workpiece itself, which is machined into a product, and the wire electrode.

SUMMARY OF THE INVENTION

A wire electrode discharge machine according to a first aspect of the invention comprises: working fluid supplying means for supplying working fluid between a wire electrode and a workpiece; a machining power source for applying a voltage to generate a discharge between the wire electrode and the workpiece through the working fluid supplied from the working fluid supplying means; a table on which the workpiece is fixed; table control means for controlling movement of the table in X-axis and Y-axis directions; a pair of wire electrode guides respectively located at the top and bottom of the workpiece; taper control means for controlling the slant of the wire electrode relative to the workpiece by moving one of the wire electrode guides in U-axis and V-axis directions; discharge position detecting means for detecting the discharge position between the wire electrode and the workpiece based on the current supplied through an upper power supplying line and a lower power supplying line from the machining power source to the wire electrode; a wire electrode slant determining means for determining the slant direction of the wire electrode relative to the workpiece based on a shift of the discharge position detected by the discharge position detecting means while approaching the wire electrode to the workpiece; and a wire electrode slant correcting means for correcting the slant of the wire electrode relative to the workpiece based on the slant direction of the wire electrode determined by the wire electrode slant checking means.

A wire electrode discharge method according to a second aspect of the invention comprises the steps of: applying voltage, by a machining power source, to generate a discharge through working fluid supplied between a wire electrode and a workpiece; controlling the movement, in the X-axis direction and the Y-axis direction, of a table to which the workpiece is fixed; controlling the slant of the wire electrode relative to the workpiece by moving, in a U-axis direction and a V-axis direction, one of a pair of wire electrode guides respectively located at the top and bottom of the workpiece; detecting the discharge position between the wire electrode and the workpiece based on the current supplied through an upper power supplying line and a lower power supplying line from the machining power source to the wire electrode; determining the slant direction of the wire electrode relative to the workpiece based on a shift of the discharge position while approaching the wire electrode to the workpiece; and correcting the slant of the wire electrode relative to the workpiece based on the slant direction of the wire electrode.

A wire electrode discharge machine according to a third aspect of the invention comprises: working fluid supplying means for supplying working fluid between a wire electrode and a workpiece; a machining power source for applying a voltage to generate a discharge between the wire electrode and the workpiece through the working fluid supplied from the working fluid supplying means; a table on which the workpiece is fixed; table control means for controlling movement of the table in X-axis and Y-axis directions; a pair of wire electrode guides respectively located at the top and bottom of the workpiece; taper control means for controlling the slant of the wire electrode relative to the workpiece by moving one of the wire electrode guides in U-axis and V-axis directions; discharge position detecting means for detecting the discharge position between the wire electrode and the workpiece based on the current supplied through an upper power supplying line and a lower power supplying line from the machining power source to the wire electrode; means for measuring the discharge position, for a prescribed time period, detected by the discharge position detecting means while approaching the wire electrode to the workpiece; discharge width computing means for calculating the distance between the upper end and the lower end of the discharge position as a discharge width in the thickness direction of the workpiece; and correcting amount computing means for calculating a correcting amount for correcting the slant of the wire electrode relative to the workpiece based on the discharge width calculated by the discharge width computing means, the thickness of the workpiece and the discharge position detected by the discharge position detecting means.

A wire electrode discharge method according to a fourth aspect of the invention comprises the steps of: applying voltage, by a machining power source, to generate a discharge through working fluid supplied between a wire electrode and a workpiece; controlling the movement, in the X-axis direction and the Y-axis direction, of a table to which the workpiece is fixed; controlling the slant of the wire electrode relative to the workpiece by moving, in a U-axis direction and a V-axis direction, one of a pair of wire electrode guides respectively located at the top and bottom of the workpiece; detecting the discharge position between the wire electrode and the workpiece based on the current supplied through an upper power supplying line and a lower power supplying line from the machining power source to the wire electrode; measuring the discharge position for a prescribed time period while approaching the wire electrode to the workpiece; calculating the distance between the upper end and the lower end of the discharge position as a discharge width in the thickness direction of the workpiece; and calculating a correcting amount for correcting the slant of the wire electrode relative to the workpiece based on the discharge width, the thickness of the workpiece and the discharge position.

A wire electrode discharge machine according to a fifth aspect of the invention comprises: working fluid supplying means for supplying working fluid between a wire electrode and a workpiece; a machining power source for applying a voltage to generate a discharge between the wire electrode and the workpiece through the working fluid supplied from the working fluid supplying means; a table on which the workpiece is fixed; table control means for controlling movement of the table in X-axis and Y-axis directions; a pair of wire electrode guides respectively located at the top and bottom of the workpiece; taper control means for controlling the slant of the wire electrode relative to the workpiece by moving one of the wire electrode guides in U-axis and V-axis directions; discharge position detecting means for detecting the discharge position between the wire electrode and the workpiece based on the current supplied through an upper power supplying line and a lower power supplying line from the machining power source to the wire electrode; means for measuring the discharge position, for a prescribed time period, detected by the discharge position detecting means while approaching the wire electrode to the workpiece; a counting means for equally dividing the thickness of the workpiece into a number specified in a predetermined program and counting a number of times of discharge at each of divided parts of the workpiece; and correcting amount computing means for calculating correcting amount for correcting the slant of the wire electrode relative to the workpiece based on the number of times of discharge counted by the counting means, the thickness of the workpiece and the discharge position detected by the discharge position detecting means.

A wire electrode discharge method according to a sixth aspect of the invention comprises the steps of: applying voltage, by a machining power source, to generate a discharge through working fluid supplied between a wire electrode and a workpiece; controlling the movement, in the X-axis direction and the Y-axis direction, of a table on which the workpiece is fixed; controlling the slant of the wire electrode relative to the workpiece by moving, in a U-axis direction and a V-axis direction, one of a pair of wire electrode guides respectively located at the top and bottom of the workpiece; detecting the discharge position between the wire electrode and the workpiece based on the current supplied through an upper power supplying line and a lower power supplying line from the machining power source to the wire electrode; measuring the discharge position for a prescribed time period while approaching the wire electrode to the workpiece; equally dividing the thickness of the workpiece into a number specified in a predetermined program and counting a number of times of discharge at each of divided parts of the workpiece; and calculating correcting amount for correcting the slant of the wire electrode relative to the workpiece based on the number of times of discharge, the thickness of the workpiece and the discharge position.

A wire electrode discharge machine according to a seventh aspect of the invention, in addition to means of one of the first, third and fifth aspect, further comprises: the discharge position storage means for moving the wire electrode guide in the U-axis and V-axis directions to slant the wire electrode so as to generate the discharge between the wire electrode and the workpiece, and storing the discharge position detected by the discharge position detecting means; and workpiece thickness computing means for calculating the thickness of the workpiece based on the discharge position stored in the discharge position storage means.

A wire electrode discharge method according to an eighth aspect of the invention, in addition to the steps described in accordance with one of the second, fourth and sixth aspects, further comprises the steps of: moving the wire electrode guide in the U-axis and V-axis directions to slant the wire electrode so as to generate a discharge between the wire electrode and the workpiece, and storing the discharge position; and calculating the thickness of the workpiece based on the stored discharge position.

A wire electrode discharge machine according to a ninth aspect of the invention, in addition to the means comprised in one of the first, third and fifth aspects, further comprises: the discharge position detecting power source, for a contour machining, for supplying power for less amount of machining per unit time compared to the machining power source.

A wire electrode discharge machine according to a tenth aspect of the invention, in addition to the means comprised in one of the first, third and fifth aspects, further comprises: working fluid supplying means for discharge position detection for supplying a working fluid for discharge position detection between the wire electrode and the workpiece in detecting the discharge position by the discharge position detecting means.

A wire electrode discharge machine according to an eleventh aspect of the invention, in addition to the means comprised in one of the first, third and fifth aspects, further comprises: an irregular discharge detecting means for detecting a concentrated discharge as an irregular discharge if the concentrated discharge is generated in detecting the discharge position by the discharge position detecting means; and a correcting amount excluding means for excluding the irregular discharge from the correcting amount calculated by the correction amount computing means when the irregular discharge is detected by the irregular discharge detecting means.

A wire electrode discharge method according to a twelfth aspect of the invention, in addition to the steps described in one of the second, fourth and fifth aspects, further comprises the steps of: detecting a concentrated discharge as an irregular discharge if the concentrated discharge is generated in detecting the discharge position; and excluding the irregular discharge from the correcting amount when the irregular discharge is detected.

A wire electrode discharge machine according to a thirteenth aspect of the invention comprises: working fluid supplying means for supplying working fluid between a wire electrode and a workpiece; a machining power source for applying a voltage to generate a discharge between the wire electrode and the workpiece through the working fluid supplied from the working fluid supplying means; a table on which the workpiece is fixed; table control means for controlling movement of the table in X-axis and Y-axis directions; a pair of wire electrode guides respectively located at the top and bottom of the workpiece; taper control means for controlling the slant of the wire electrode relative to the workpiece by moving one of the wire electrode guides in U-axis and V-axis directions; discharge position detecting means for detecting the discharge position between the wire electrode and the workpiece based on the current supplied through an upper power supplying line and a lower power supplying line from the machining power source to the wire electrode; wire electrode slant computing means for calculating the slant of the wire electrode to each of a plurality of workpieces based on the discharge position detected by the discharge position detecting means; correcting amount computing means for calculating a correcting amount for correcting the slant of the wire electrode relative to the workpiece based on the slant of the wire electrode calculated by the wire electrode slant computing means; a correcting amount storage means for storing the correcting amount calculated by the correcting amount computing means; and a machining continuing means for continuing machining the workpiece by recalling one of the correcting amounts stored in the correcting amount storage means corresponding to the workpiece to be machined while executing a prescribed program.

A wire electrode discharge method according to a fourteenth aspect of the invention comprises the steps of: applying voltage, by a machining power source, to generate a discharge through working fluid supplied between a wire electrode and a workpiece; controlling the movement, in the X-axis direction and the Y-axis direction, of a table on which the workpiece is fixed; controlling the slant of the wire electrode relative to the workpiece by moving, in a U-axis direction and a V-axis direction, one of a pair of wire electrode guides respectively located at the top and bottom of the workpiece; detecting the discharge position between the wire electrode and the workpiece based on the current supplied through an upper power supplying line and a lower power supplying line from the machining power source to the wire electrode; calculating the slant of the wire electrode to each of a plurality of the workpieces based on the discharge position; calculating a correcting amount for correcting the slant of the wire electrode relative to the workpiece based on the slant of the wire electrode; storing the correcting amount; and continuing machining the workpiece by recalling one of the correcting amounts corresponding to the workpiece to be machined while executing a prescribed program.

A wire electrode discharge machine according to a fifteenth aspect of the invention comprises: working fluid supplying means for supplying working fluid between a wire electrode and a workpiece; a machining power source for applying a voltage to generate a discharge between the wire electrode and the workpiece through the working fluid supplied from the working fluid supplying means; a table on which the workpiece is fixed; table control means for controlling movement of the table in X-axis and Y-axis directions; a pair of wire electrode guides respectively located at the top and bottom of the workpiece; taper control means for controlling the slant of the wire electrode relative to the workpiece by moving one of the wire electrode guides in U-axis and V-axis directions; discharge position detecting means for detecting the discharge position between the wire electrode and the workpiece based on the current supplied through an upper power supplying line and a lower power supplying line from the machining power source to the wire electrode; discharge width computing means for calculating a discharge width based on the amount the discharge position shifts in the X-axis and Y-axis directions detected by the discharge position detecting means at fixed time intervals; a discharge width storage means for storing the discharge width calculated by the discharge width computing means; an amount of variation computing means for calculating an amount of variation of the discharge width calculated by the discharge width computing means; and a wire electrode slant computing means for calculating the slant of the wire electrode based on the shifting amount of the discharge position in the X-axis and Y-axis directions detected by the discharge position detecting means until the amount of variation becomes zero after a first discharge is generated.

A wire electrode discharge method according to a sixteenth aspect of the invention comprises the steps of: applying voltage, by a machining power source, to generate a discharge through working fluid supplied between a wire electrode and a workpiece; controlling the movement, in the X-axis direction and the Y-axis direction, of a table on which the workpiece is fixed; controlling the slant of the wire electrode relative to the workpiece by moving, in a U-axis direction and a V-axis direction, one of a pair of wire electrode guides respectively located at the top and bottom of the workpiece; detecting the discharge position between the wire electrode and the workpiece based on the current supplied through an upper power supplying line and a lower power supplying line from the machining power source to the wire electrode; calculating a discharge width based on the amount the discharge position shifts in the X-axis and Y-axis directions at fixed time intervals; storing the discharge width; calculating an amount of variation of the discharge width; and calculating the slant of the wire electrode based on the shifting amount of the discharge position in the X-axis and Y-axis directions until the amount of variation becomes zero after a first discharge is generated.

A wire electrode discharge machine according to a seventeenth aspect of the invention comprises: working fluid supplying means for supplying working fluid between a wire electrode and a workpiece; a machining power source for applying a voltage to generate a discharge between the wire electrode and the workpiece through the working fluid supplied from the working fluid supplying means; a table on which the workpiece is fixed; table control means for controlling movement of the table in X-axis and Y-axis directions; a pair of wire electrode guides respectively located at the top and bottom of the workpiece; taper control means for controlling the slant of the wire electrode relative to the workpiece by moving one of the wire electrode guides in U-axis and V-axis directions; discharge position detecting means for detecting the discharge position between the wire electrode and the workpiece based on the current supplied through an upper power supplying line and a lower power supplying line from the machining power source to the wire electrode; discharge width computing means for moving the wire electrode guide in the U-axis and V-axis directions while carrying out machining for contouring the workpiece by moving the table in the X-axis and Y-axis directions, and calculating the amount of variation of the discharge width based on the amount the discharge position shifts in the U-axis and V-axis directions detected by the discharge position detecting means at fixed time intervals; and a wire electrode slant computing means for calculating the slant of the wire electrode where the amount of variation of the discharge width calculated by the discharge width computing means is minimum.

A wire electrode discharge method according to an eighteenth aspect of the invention comprises the steps of: applying voltage, by a machining power source, to generate a discharge through working fluid supplied between a wire electrode and a workpiece; controlling the movement, in the X-axis direction and the Y-axis direction, of a table on which the workpiece is fixed; controlling the slant of the wire electrode relative to the workpiece by moving, in a U-axis direction and a V-axis direction, one of a pair of wire electrode guides respectively located at the top and bottom of the workpiece; detecting the discharge position between the wire electrode and the workpiece based on the current supplied through an upper power supplying line and a lower power supplying line from the machining power source to the wire electrode; moving the wire electrode guide in the U-axis and V-axis directions while carrying out machining for contouring the workpiece by moving the table in the X-axis and Y-axis directions, and calculating the amount of variation of the discharge width based on the amount the discharge position shifts in the U-axis and V-axis directions at fixed time intervals; and calculating the slant of the wire electrode where the amount of variation of the discharge width is minimum.

A wire electrode discharge method according to a nineteenth aspect of the invention comprises: working fluid supplying means for supplying working fluid between a wire electrode and a workpiece; a machining power source for applying a voltage to generate a discharge between the wire electrode and the workpiece through the working fluid supplied from the working fluid supplying means; a table on which the workpiece is fixed; table control means for controlling movement of the table in X-axis and Y-axis directions; a pair of wire electrode guides respectively located at the top and bottom of the workpiece; taper control means for controlling the slant of the wire electrode relative to the workpiece by moving one of the wire electrode guides in U-axis and V-axis directions; discharge position detecting means for detecting the discharge position between the wire electrode and the workpiece based on the current supplied through an upper power supplying line and a lower power supplying line from the machining power source to the wire electrode; and correcting amount computing means for calculating a correcting amount for correcting the slant of the wire electrode relative to the workpiece based on a shift of the discharge position, while performing approach machining, which is a shape machining for the workpiece, until the wire electrode reaches a product contour.

A wire electrode discharge method according to a twentieth aspect of the invention comprises the steps of: applying voltage, by a machining power source, to generate a discharge through working fluid supplied between a wire electrode and a workpiece; controlling the movement, in the X-axis direction and the Y-axis direction, of a table on which the workpiece is fixed; controlling the slant of the wire electrode relative to the workpiece by moving, in a U-axis direction and a V-axis direction, one of a pair of wire electrode guides respectively located at the top and bottom of the workpiece; detecting the discharge position between the wire electrode and the workpiece based on the current supplied through an upper power supplying line and a lower power supplying line from the machining power source to the wire electrode; and calculating a correcting amount for correcting the slant of the wire electrode relative to the workpiece based on a shift of the discharge position, while performing approach machining, which is a shape machining for the workpiece, until the wire electrode reaches a product contour.

BRIEF DESCRIPTION OF THE DRAWINGS

FIGS. 17a, 17b and 17c are explanatory drawings showing a method for correcting the slant of a wire electrode relative to a workpiece while machining the workpiece in a wire electrode discharge machine according to a ninth embodiment of the present invention.

DESCRIPTION OF THE PREFERRED EMBODIMENTS

Figure 1:
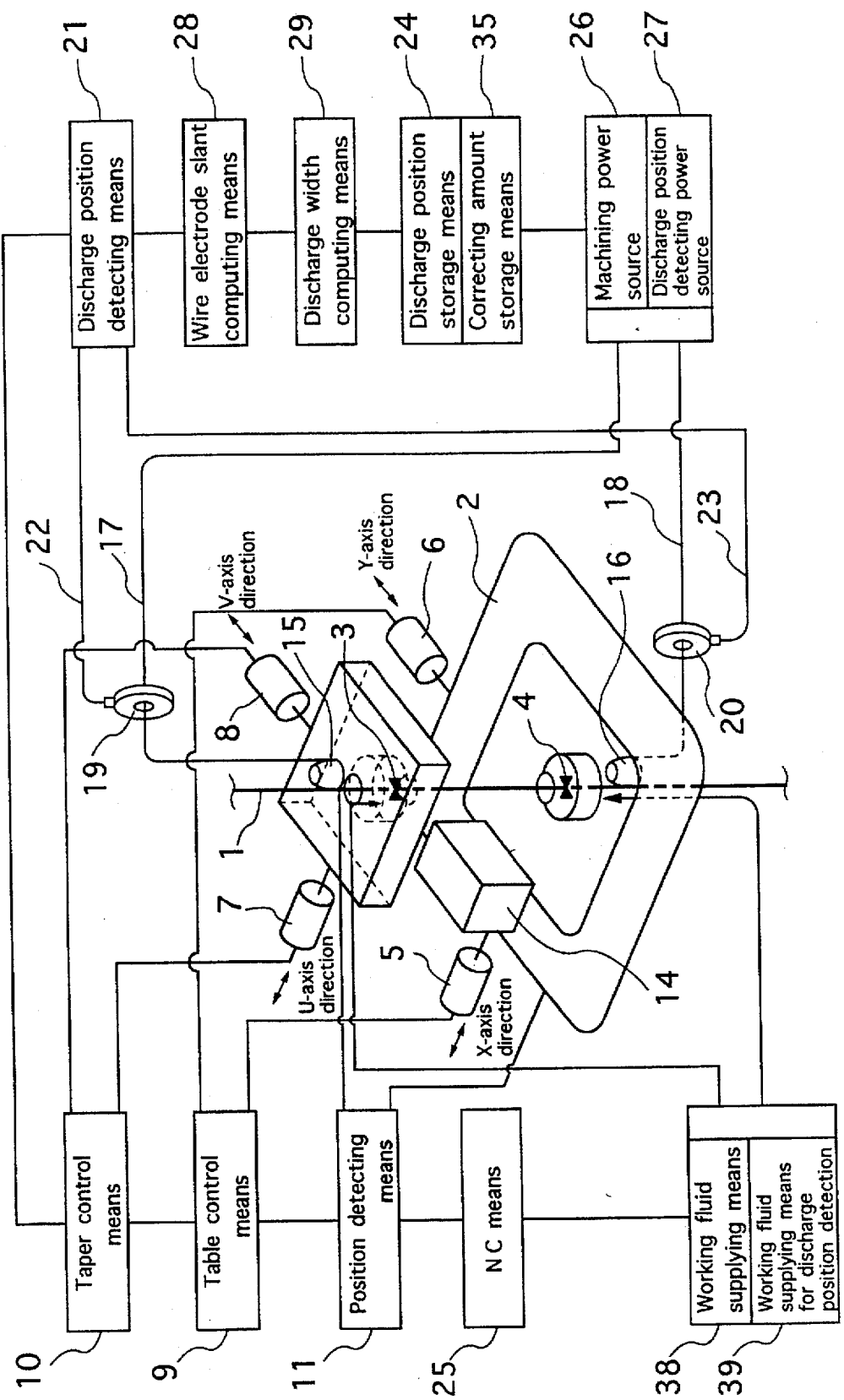
FIG. 1 is a diagrammatic illustration showing a wire electrode discharge machine according to a first embodiment to a ninth embodiment of the present invention.

According to the first and second aspects of the invention, voltage is applied, by a machining power source, to generate a discharge through a working fluid supplied between a wire electrode and a workpiece. The movement, in the X-axis direction and the Y-axis direction, of a table on which the workpiece is fixed is controlled. The slant of the wire electrode relative to the workpiece is controlled by moving, in a U-axis direction and a V-axis direction, one of a pair of wire electrode guides respectively located at the top and bottom of the workpiece. The discharge position between the wire electrode and the workpiece is detected based on the current supplied from the machining power source to the wire electrode. The slant direction of the wire electrode relative to the workpiece is decided based on a shift of the discharge position detected at the time of approaching the wire electrode to the workpiece. The slant of the wire electrode relative to the workpiece is corrected based on the slant direction of the wire electrode. Therefore, it is possible to correct the slant of the wire electrode relative to the workpiece directly by using the wire electrode.

In accordance with the third and fourth aspects of the invention, a voltage is applied, by a machining power source, to generate a discharge through the working fluid supplied between the wire electrode and workpiece. The movement, in the X-axis direction and the Y-axis direction, of a table on which the workpiece is fixed is controlled. The slant of the wire electrode relative to the workpiece is controlled by moving, in a U-axis direction and a V-axis direction, one of a pair of wire electrode guides respectively located at the top and bottom of the workpiece. The discharge position between the wire electrode and the workpiece is detected based on the current supplied from the machining power source to the wire electrode. The discharge position is measured for a prescribed time period while approaching the wire electrode to the workpiece. The distance between the upper end and the lower end of the discharge position is calculated as a discharge width in the thickness direction of the workpiece. A correcting amount for correcting the slant of the wire electrode relative to the workpiece is calculated based on the discharge width, the thickness of the workpiece and the discharge position. Therefore, it is possible to correct the slant of the wire electrode relative to the workpiece directly by using the wire electrode. In addition, it is possible to correct the slant of the wire electrode relative to the workpiece quickly.

In accordance with the fifth and sixth aspects of the invention, a voltage is applied, by a machining power source, to generate a discharge through working fluid supplied between the wire electrode and the workpiece. The movement, in the X-axis direction and the Y-axis direction, of a table on which the workpiece is fixed is controlled. The slant of the wire electrode relative to the workpiece is controlled by moving, in a U-axis direction and a V-axis direction, one of a pair of wire electrode guides respectively located at the top and bottom of the workpiece. The discharge position between the wire electrode and the workpiece is detected based on the current supplied from the machining power source to the wire electrode. The discharge position is measured for a prescribed time period while approaching the wire electrode to the workpiece. The thickness of the workpiece is equally divided into a number specified in a predetermined program, and a number of times of discharge is counted for each of the divided parts of the workpiece. A correcting amount for correcting the slant of the wire electrode relative to the workpiece is calculated based on the number of times of discharge, the thickness of the workpiece and the discharge position. Therefore, it is possible to correct the slant of the wire electrode relative to the workpiece directly by using the wire electrode. In addition, it is possible to correct the slant of the wire electrode relative to the workpiece quickly.

In accordance with the seventh and eighth aspects of the invention, in addition, the discharge position, which is detected by the discharge generated between the wire electrode and the workpiece by moving the wire electrode guide in the U-axis and V-axis directions to slant the wire electrode, is stored. Then, the workpiece thickness is calculated from the discharge position. Thus, the workpiece thickness is calculated automatically. Therefore, the verticality check of the wire electrode, which was conventionally carried out after measuring correctly the workpiece thickness and specifying it, can be carried out in a series of operations, so that it is possible to improve accuracy. In addition, the slant of the wire electrode 1 relative to the workpiece 14 can be corrected at the same time with detecting the discharge position.

In accordance with the ninth aspect of the invention, in addition to the first, third and fifth aspect, since it comprises the discharge position detecting power source, for contour machining, for supplying power for less amount of machining per unit time compared to the machining power source, it is possible to check the verticality of the wire electrode by discharge with little damage on a machining surface. In addition, one of two machining power sources can be selected optionally, so that it is possible to select them freely to check the vertically by discharge while machining a contour. Moreover, it is possible to correct the slant of the wire electrode relative to the workpiece according to conditions.

In accordance with the tenth aspect of the invention, since the working fluid for discharge position detection is supplied between the wire electrode and the workpiece in detecting the discharge position, it is possible to make the discharge stable and control the discharge gap properly at the discharge position detecting time. Moreover, it is possible to perform a verticality check by discharge with high accuracy.

In accordance with the eleventh and twelfth aspects, the irregular discharge detected due to the concentrated discharge is excluded from the correcting amount. Therefore, it is possible to detect the discharge position with higher accuracy by excluding the irregular discharge due to the concentrated discharge.

In accordance with the thirteenth and fourteenth aspects of the invention, voltage is applied, by a machining power source, to generate a discharge through working fluid supplied between a wire electrode and a workpiece. The movement, in the X-axis direction and the Y-axis direction, of a table on which the workpiece is fixed is controlled. The slant of the wire electrode relative to the workpiece is controlled by moving, in a U-axis direction and a V-axis direction, one of a pair of wire electrode guides respectively located at the top and bottom of the workpiece. The discharge position between the wire electrode and the workpiece is detected based on the current supplied from the machining power source to the wire electrode. The slant of the wire electrode relative to each of a plurality of the workpieces is calculated based on the discharge position. A correcting amount for correcting the slant of the wire electrode relative to the workpiece is calculated based on the slant of the wire electrode. Machining of the workpiece is continued by recalling one of the stored correcting amounts corresponding to the workpiece to be machined while executing a prescribed program. Therefore, it is not necessary to very accurately fix the workpiece to the table. Accordingly, even if there are a plurality of workpieces, it is possible to automate all processes from the verticality check of the wire electrode to the contour machining, only by fixing the workpieces on the table.

In accordance with the fifteen and sixteenth aspects of the invention, voltage is applied, by a machining power source, to generate a discharge through working fluid supplied between a wire electrode and a workpiece. The movement, in the X-axis direction and the Y-axis direction, of a table on which the workpiece is fixed is controlled. The slant of the wire electrode relative to the workpiece is controlled by moving, in a U-axis direction and a V-axis direction, one of a pair of wire electrode guides respectively located at the top and bottom of the workpiece. The discharge position between the wire electrode and the workpiece is detected based on the current supplied from the machining power source to the wire electrode. The discharge width is calculated based on the amount the discharge position shifts in the X-axis and Y-axis directions occurring at fixed time intervals. The discharge width is stored. The amount of variation of the discharge width is calculated. The slant of the wire electrode is calculated based on the shifting amount of the discharge position, in the X-axis and Y-axis directions, detected until the amount of variation becomes zero after a first discharge is generated. Therefore, it is possible to correct the slant of the wire electrode relative to the workpiece automatically without specifying the workpiece thickness.

In accordance with the seventeenth and eighteenth aspects of the invention, voltage is applied, by a machining power source, to generate a discharge through working fluid supplied between a wire electrode and a workpiece. The movement, in the X-axis direction and the Y-axis direction, of a table on which the workpiece is fixed is controlled. The slant of the wire electrode relative to the workpiece is controlled by moving, in a U-axis direction and a V-axis direction, one of a pair of wire electrode guides respectively located at the top and bottom of the workpiece. The discharge position between the wire electrode and the workpiece is detected based on the current supplied from the machining power source to the wire electrode. The wire electrode guide is moved in the U-axis and V-axis directions while contour machining of the workpiece is carried out by moving the table in the X-axis and Y-axis directions. The amount of variation of the discharge width is calculated based on the amount the discharge position shifts in the U-axis and V-axis directions at fixed time intervals. The slant of the wire electrode, where the amount of variation of the discharge width is minimum, is calculated. Therefore, it is possible to check the verticality of the wire electrode by discharge properly in the machining workpiece without specifying the workpiece thickness.

In accordance with the nineteenth and twentieth aspects of the invention, voltage is applied, by a machining power source, to generate a discharge through working fluid supplied between a wire electrode and a workpiece. The movement, in the X-axis direction and the Y-axis direction, of a table on is which the workpiece is fixed is controlled. The slant of the wire electrode relative to the workpiece is controlled by moving, in a U-axis direction and a V-axis direction, one of a pair of wire electrode guides respectively located at the top and bottom of the workpiece. The discharge position between the wire electrode and the workpiece is detected based on the current supplied from the machining power source to the wire electrode. A correcting amount for correcting the slant of the wire electrode relative to the workpiece is calculated based on a shift of the discharge position, while performing approach machining, which is a shape machining for the workpiece, until the wire electrode reaches a product contour. Therefore, it is possible to correct the slant of the wire electrode relative to the workpiece automatically while performing the approach machining without specifying the workpiece thickness.

A wire electrode discharge machine and method of this invention is described hereafter on the basis of specific embodiments.

First Embodiment

FIG. 1 is a diagrammatic structural drawing of a wire electrode discharge machine according to a first embodiment of the present invention. The same reference numerals or symbols are applied to the same structures or corresponding parts as those of the aforementioned prior art.

In FIG. 1, reference numeral 1 indicates a wire electrode, 14 is a rectangular parallel-piped workpiece, 2 is a table on which the workpiece is fixed 14. Reference numeral 3 is an upper wire electrode guide, 4 is a lower wire electrode guide, 5 is an X-axis motor which moves the table 2 in the X-axis direction, 6 is a Y-axis motor which moves the table 2 in the Y-axis direction, 7 is a U-axis motor which moves the upper wire electrode guide 3 in the U-axis direction, 8 is a V-axis motor which moves the upper wire electrode guide 3 in the V-axis direction, 9 is table control means which controls the movement of the table 2 in the X-axis and Y-axis direction by driving the X-axis motor 5 and the Y-axis motor 6. Reference numeral 10 is taper control means which controls the movement of the upper wire electrode guide 3 in the U-axis and V-axis direction by driving the U-axis motor 7 and the V-axis motor 8. Reference numeral 11 is a position detecting means which makes the wire electrode 1 contact with the workpiece and detects the contact point of therebetween. Reference numeral 15 is an upper power supplying die which supplies power from an upper part of the wire electrode 1. Reference numeral 16 is a lower power supplying die which supplies power from a lower part of the wire electrode 1. Reference numeral 17 is an upper power feeder which supplies the power to the upper power supplying die 1. Reference numeral 18 is a lower power feeder which supplies the power to the lower power supplying die 16. Reference numeral 19 is an upper current sensor which measures a current flowing in the upper power feeder 17. Reference numeral 20 is a lower current sensor which measures a current flowing in the lower power feeder 18.

Reference numeral 21 is a discharge position detecting means which detects the discharge position based on the current measured by the upper current sensor 19 and the lower current sensor 20. Reference numeral 22 is an upper signal line which transmits a detection signal from the upper current sensor 19. Reference numeral 23 is a lower signal line which transmits a detection signal from the lower current sensor 20. Reference numeral 24 is a discharge position storage means which stores data such as discharge positions detected by the discharge position detecting means 21. Reference numeral 25 is an NC means, 26 is a machining power source, 27 is the discharge position detecting power source, 28 is a wire electrode slant computing means which calculates the slant of the wire electrode on the basis of the data such as discharge positions detected by the discharge position detecting means 21. Reference numeral 29 is a discharge width computing means which calculates a discharge width, i.e., a width of discharge position or area, on the basis of the data such as discharge positions detected by the discharge position detecting means 21. Reference numeral 35 is a correcting amount storage means which stores a correction amount, 38 is working fluid supplying means, and 39 is working fluid supplying means for discharge position detection.

Figure 2:
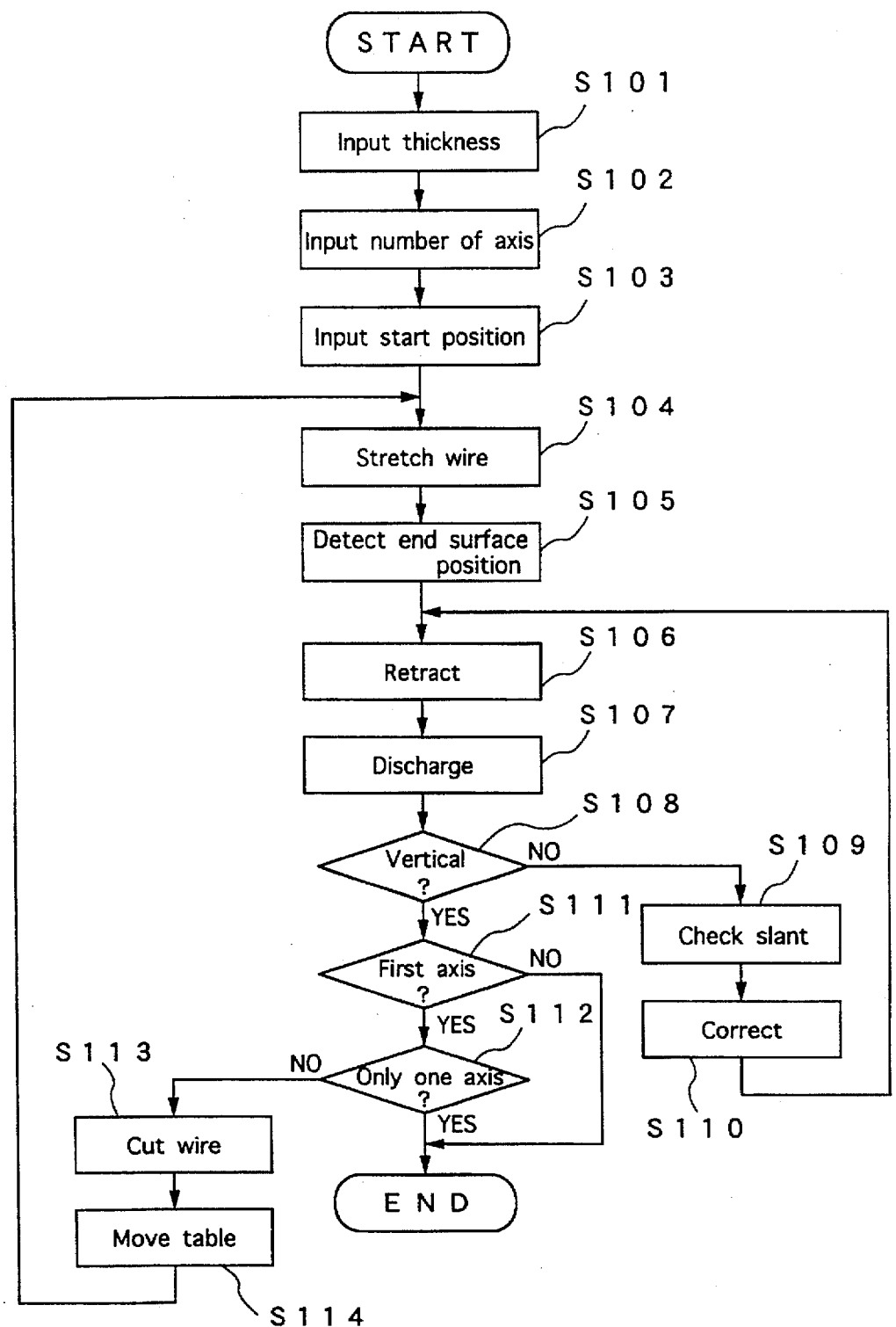
FIG. 2 is a flow chart showing a procedure carried out by an NC means of a wire electrode discharge machine according to the first embodiment of the present invention.

Next, processes for the operation of the wire electrode discharge machine, according to this embodiment, are described based on a flowchart of FIG. 2. Each operation in FIG. 2 is automatically carried out on the basis of a prespecified value by the NC means 25.

In Step S101, the thickness of the workpiece 14 is input to the NC machine 25. Next in Step S102, the number of the axis to be corrected is input to the NC machine 25. In case the slant of the wire electrode is corrected only in one axis direction, X-axis (U-axis) or Y-axis (V-axis), "1" is input, and in case of two axis directions, X-axis (U-axis) and Y-axis (V-axis), "2" is input. In Step S103, the position to start correcting is input. At this time, it is instructed whether to start the correction from the present position or to start from a different position after shifting the table 2 either in the X-axis or Y-axis direction. If the slant of the wire electrode is corrected in the two axis directions, the starting position for the second axis is also input. These values are input by using the coordinate values or moving amount of the table. Further, it is instructed whether to shift the table to the second axis direction in the shortest distance or to shift the table to the second axis direction so as to evade collision between the wire electrode and the workpiece 14. In case of evading the collision, it is instructed whether to specify a moving amount and move the table based thereon or to input coordinate values and move it thereon via these points, and such specification or values are input.

The procedure proceeds to Step S104, and the wire electrode 1 is stretched between the upper wire electrode guide 3 and the lower wire electrode guide 4. Then, the procedure proceeds to Step S105. Electric discharge is performed on the end face position of the workpiece 14, and the end face position of the workpiece 14 is detected to determine the place for applying electric discharge voltage for checking the verticality of the wire electrode. Then, the procedure proceeds to Step S106, and the wire electrode is moved back relatively from the end face position of the table 2 detected in Step S105 by a prescribed amount by shifting the table 2 so as to apply electric discharge voltage for checking the verticality of the wire electrode 1. Next, the procedure proceeds to Step S107, electric discharge voltage is applied, and the wire electrode 1 relatively approaches the workpiece 14 fixed on the table 2 from the X-axis direction undergoing a slow movement. In this operation, when the prescribed period or prescribed number of times of discharge between the wire electrode 1 and the workpiece 14 is detected, the X-axis motor 5 stops rotating and the wire electrode 1 stops approaching the workpiece 14 from the X-axis direction. Then, the procedure proceeds to Step S108, and it is decided if the wire electrode 1 is vertical to the workpiece 14 in the X-axis direction or not on the basis of the discharge position or area at the time when the discharge is detected for the prescribed period, or on the basis of the discharge position or area at the time when the discharge is detected by the prescribed times, within the period prior to the time the wire electrode 1 stops approaching the workpiece 14 in the X-axis direction. That is, if the detected discharge position or area has no shift, it is decided that the wire electrode 1 is vertical to the workpiece 14 in the X-axis direction. If it is decided in Step S108 that the wire electrode 1 is not vertical, the procedure proceeds to Step S109. Then, the direction of the slant, in either the positive or negative direction of the U-axis or V-axis, is checked based on the shifting condition of the discharge position. Next, the procedure proceeds to Step S110, and the slant is corrected by a prescribed amount according to the result of Step S109. After that, the procedure returns to Step S106 and the same procedure is repeated.

If it is decided in Step S108 that the wire electrode 1 is vertical to the workpiece 14, the procedure proceeds to Step S111, and it is decided whether the axis which has been corrected is the first axis or not. If it is decided in Step S111 that it is the first axis, the procedure proceeds to Step S112. Then, it is decided whether only one axis should be corrected or not, that is, whether the second axis should be also corrected or not, based on the number of the axis input in Step S102. If it is decided in Step S112 that the number of the axis to be corrected is two, the procedure proceeds to Step S113 and the wire electrode 1 is cut off. This is a process to prevent the wire electrode 1 from interfering with the workpiece 14, e.g., being caught thereon, so as to avoid the workpiece 14 from moving or the wire electrode 1 from breaking off, when shifting the wire electrode 1 in Step S114 to the start position for correcting the second axis which has been input in Step S103. Then, the procedure proceeds to Step S114, and the table 2 is shifted to the start position for correcting the second axis which has been input in Step S103, by rotating the X-axis motor 5 and the Y-axis motor 6. After that, the procedure returns to Step S104 and the same process is repeated. If it is decided in Step S111 that it is the second axis, or decided in Step S112 that the number of the axis to be corrected is one, the above program is ended.

As a specific example, the process in the case the number of axes to be corrected is two is described based on the flowchart of FIG. 2.

In Step S101, the thickness of the workpiece 14 is input. In Step S102, "2" is input as the number of the axes to be corrected. In Step S103, the starting positions for correcting the first axis and the second axis and a way of movement from the first axis to the second axis are input into the NC means 25. In Step S104, the wire electrode 1 is stretched. In Step S104, the table 2 is moved in the X-axis direction, so that the workpiece 14 fixed on the table 2 approaches the wire electrode 1. Then, the contact point of the wire electrode 1 and the workpiece 14 is detected by the position detecting means 11. In Step S106, the workpiece 14 fixed on the table 2 is moved back by a prescribed amount in the X-axis direction from the contact point of the wire electrode 1 and the workpiece 14. In Step S107, discharge voltage is applied, and the wire electrode 1 relatively approaches the workpiece 14 fixed on the table 2 while being moved slowly. In Step S108, when the predetermined time period or predetermined number of times of discharge is detected between the wire electrode 1 and the workpiece 14, the X-axis motor 5 stops rotating and the wire electrode 1 stops approaching the workpiece 14 in the X-axis direction.

In Step S108, it is decided whether the wire electrode 1 is vertical to the workpiece 14 or not, on the basis of the discharge position or area at the time when the discharge is detected for the fixed time period or on the basis of the discharge position or area at the time when the discharge is detected by the fixed number of times, within the time period prior to the time the wire electrode 1 stops relative approach to the workpiece 14 in the X-axis direction by stopping rotating the X-axis motor 5. If it is decided in Step S108 that the wire electrode 1 is not vertical, the procedure proceeds to Step S109 to check the direction of the slant, either the positive or negative direction of the U-axis or V-axis, on the basis of the detected discharge position. Then, the slant axis is confirmed in Step S109. In Step S110, the slant is corrected by the prescribed amount in such a direction as corrects the axis. Then, the process returns to Step S106, and the wire electrode 1 is moved back relatively from the position where it touches the workpiece 14 by a fixed amount, which has been predetermined beforehand, in the X-axis direction. Thereafter, the discharge is generated in Step S107, and the correction is repeated until it is decided in Step S108 that the wire electrode 1 is vertical to the workpiece 14.

If it is decided in Step S108 that the wire electrode 1 is vertical to the workpiece 14, the procedure proceeds to Step S111, and it is decided whether the axis which has been corrected is the first axis or not. In Step S112, it is decided whether only one axis should be corrected or not. In this case, it is required to correct the slant in another axis direction. Therefore, the wire electrode 1 is cut off in Step S113. In Step S114, the wire electrode 1 is moved relatively to the workpiece 14 by the prescribed moving amount by rotating the X-axis motor 5 and the Y-axis motor 6. In this way, in the same procedure for the first axis correction, the moving direction of the electrode 1 is changed from the X-axis direction to the Y-axis direction, while the correcting direction of the slant is changed from U-axis direction to the V-axis direction, so that the slant of the wire electrode 1 relative to the workpiece 14 is corrected. After that, it is decided in Step S111 whether the axis which has been corrected is the first axis or not. In this case, the correction is for the second axis, so that this process is ended.

Figure 4:
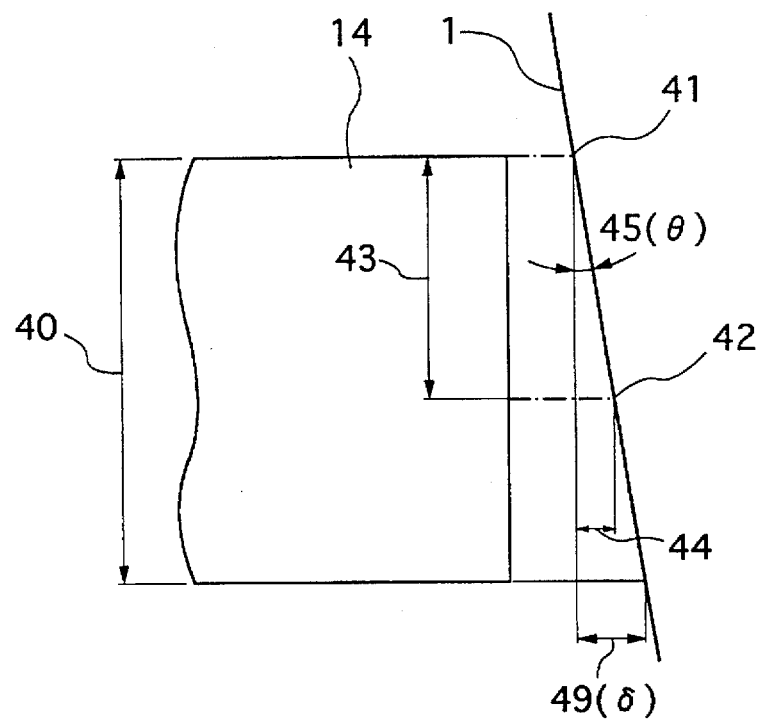
FIG. 4 is an explanatory drawing showing the relation between the slant of a wire electrode relative to a workpiece and the discharge position, and a theory to calculate a slant correcting amount in the wire electrode discharge machine according to the first and the second embodiment of the present invention.

The following is a description of FIG. 4 showing the relation between the slant of the wire electrode 1 relative to a reference surface of the workpiece 14 and the discharge position or area.

In FIG. 4, reference 1 indicates a wire electrode, 14 is a workpiece, 40 is the thickness of the workpiece 14, which is previously specified, 41 is the discharge upper end, and 42 is the discharge lower end.

The operation is described hereunder.

As shown in FIG. 4, as the wire electrode 1 relatively approaches the workpiece 14 fixed on the table 2, there takes place a discharge between the workpiece 14 and the wire electrode 1 at the position where the distance therebetween becomes a certain value. The wire electrode 1 is kept moving toward the workpiece 14 until a discharge is generated a predetermined time period or a predetermined number of times. the discharge position, which is defined as a vertically extending area between the wire electrode 1 and the workpiece 14 fixed on the table 2, is measured for the above predetermined time period or the number of times of discharge. The upper position 41 and the lower position 42 of the discharge are detected and stored in the discharge position storage means 24. The approach of the wire electrode 1 to the workpiece 14 continues until after the fixed time period or the fixed number of times of discharge. If the upper position 41 and the lower position 42 of the discharge vary or shift during the discharge, it is decided that the wire electrode 1 is slanted and therefore not vertical to the workpiece 14.

To the contrary, in case the upper position 41 and the lower position 42 of the discharge do not shift, it is decided that the wire electrode 1 is vertical to the workpiece 14. When the wire electrode 1 is not vertical to the workpiece 14, as mentioned above, the slant of the axis is confirmed, and the slant of the electrode 1 is corrected by a certain amount in such a direction as makes the axis vertical to the workpiece 14. Then, the same procedure is repeated until the upper position 41 and the lower position 42 of the discharge do not shift. By this process, the wire electrode 1 becomes vertical to the workpiece 14 in the X-axis direction or Y-axis direction. In case the number of the axis to be corrected is 2, the second axis is corrected in the same way.

As mentioned above, the wire electrode discharge machine of the present embodiment comprises working fluid supplying means 38 for supplying working fluid between a wire electrode 1 and a workpiece 14; a machining power source 26 for applying a voltage to generate a discharge between the wire electrode 1 and the workpiece 14 through the working fluid supplied from the working fluid supplying means 38; a table 2 on which the workpiece 14 is fixed; table control means 9 for controlling movement of the table 2 in X-axis and Y-axis directions; a pair of wire electrode guides 3, 4 respectively located at the top and bottom of the workpiece 14; taper control means 10 for controlling the slant of the wire electrode 1 relative to the workpiece 14 by moving one of the wire electrode guides 3, 4 in U-axis and V-axis directions; discharge position detecting means 21 for detecting the discharge position between the wire electrode 1 and the workpiece 14 based on the current supplied through an upper power supplying line 17 and a lower power supplying line 18 from the machining power source 26 to the wire electrode 1; wire electrode slant determining means, constituted by an NC means 25, for determining the slant direction of the wire electrode 1 relative to the workpiece 14 based on a shift of the discharge position detected by the discharge position detecting means 21 while approaching the wire electrode 1 relative to the workpiece 14; and wire electrode slant correcting means, constituted by an NC means 25, for correcting the slant of the wire electrode 1 relative to the workpiece 14 based on the slant direction of the wire electrode 1 decided by the wire electrode slant checking means. The invention also encompasses the method for wire electrode discharge machining by which the above apparatus operates.

Accordingly, voltage is applied, by the machining power source 26, to generate a discharge through working fluid supplied between the wire electrode 1 and the workpiece 14 from the working fluid supplying means 38. The movement, in the X-axis direction and the Y-axis direction, of the table 2 on which the workpiece 1 is fixed is controlled by the table control means 25. The slant of the wire electrode 1 relative to the workpiece 14 is controlled by the taper control means 10 by moving, in the U-axis direction and the V-axis direction, one of a pair of wire electrode guides 3, 4 respectively located at the top and the bottom of the workpiece 14. The discharge position between the wire electrode 1 and the workpiece 14 is detected by the discharge position detecting means 21 based on the current supplied from the machining power source to the wire electrode. The slant direction of the wire electrode 1 relative to the workpiece 14 is determined by the NC means 25 as the wire electrode slant determining means, based on a shift of the discharge position detected at the time of approaching the wire electrode 1 to the workpiece 14. The slant of the wire electrode 1 relative to the workpiece 14 is corrected by the NC means 25 as the wire electrode slant correcting means, based on the slant direction of the wire electrode.

Therefore, it is possible to correct the slant of the wire electrode 1 relative to the workpiece 14 directly by using the wire electrode 1. As a result, it is possible to drastically reduce the time necessary for fixing the workpiece 14 on the table 2 and time necessary for arrangements such as a verticality checking of workpiece.

In the above-described embodiment, when the wire electrode 1 is not vertical to the workpiece 14, the wire electrode 1 is made vertical in the X-axis direction or Y-axis direction by confirming the slant axis, correcting the axis by a certain degree in such a direction as to make it vertical, and repeating the process until the positions of the discharge upper end 41 and the discharge lower end 42 becomes stationary. However, the present invention is not limited to the above, but the following arrangements may also be employed.

That is, the slant axis can be moved by a relative large amount in one correction in such a direction as to make it vertical, thereby slanting the axis in the opposite direction. Then, the moving direction and the moving amount of the axis to make the wire electrode 1 vertical to the workpiece 14 are calculated on the basis of the change of the positions of the discharge upper end 41 and the discharge lower end 42 in confirming the slant axis for the first time and the change of the positions of the discharge upper end 41 and the discharge lower end 42 after slanting the axis in the opposite direction. If the wire electrode 1 does not become vertical to the workpiece 14 even after moving the axis, the same procedure is repeated. By this process, the wire electrode 1 can finally be made vertical to the workpiece 14.

Second Embodiment

Figure 3:
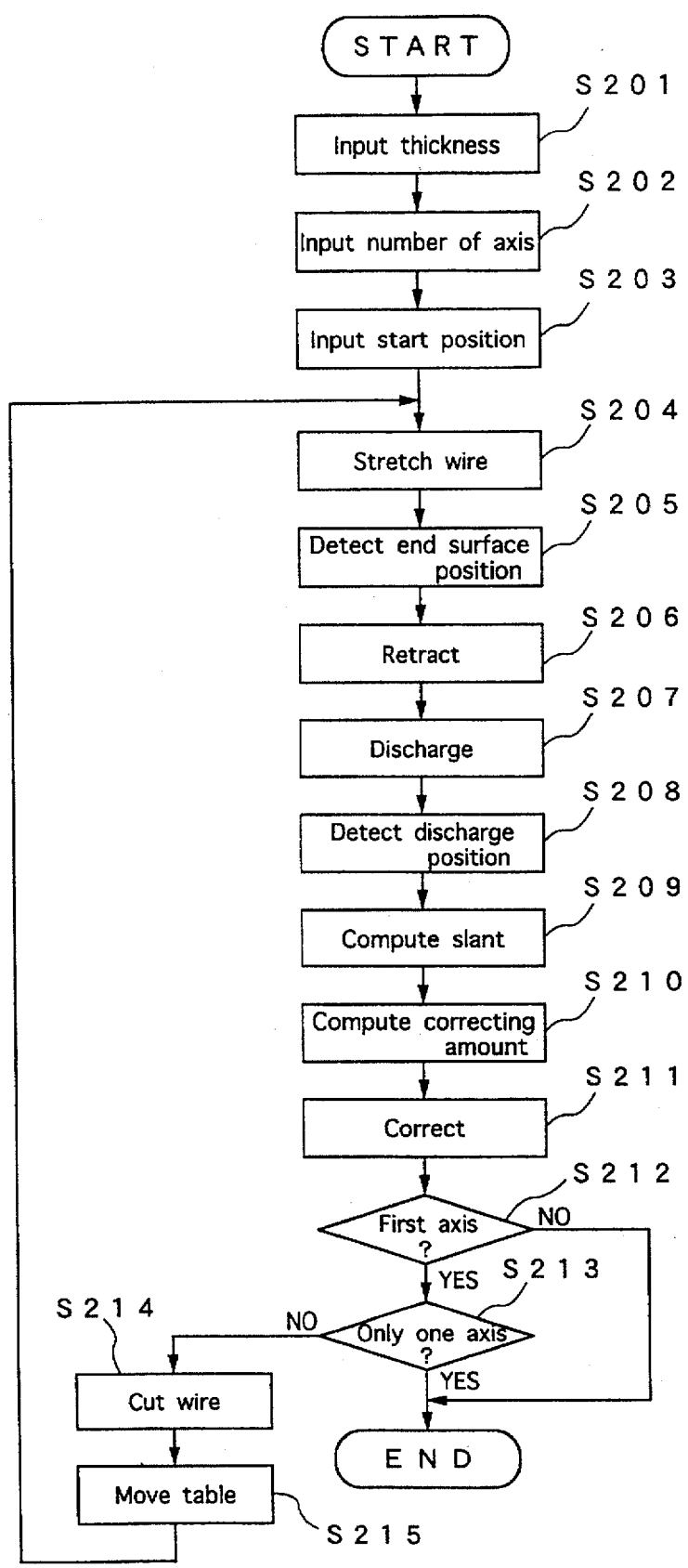
FIG. 3 is a flow chart showing a procedure by an NC machine of a wire electrode discharge machine according to the second embodiment of the present invention.

FIG. 3 is a flow chart which shows a procedure for the operation of the wire electrode discharge machine according to a second embodiment of the present invention. The general construction of the wire electrode discharge machine according to the present embodiment is same as that of FIG. 1, therefore a further detailed description thereof is omitted, and FIG. 1 is referred to when required. Each operation in FIG. 3 is automatically carried out on the basis of prespecified values by an NC means 25.

In FIG. 3, the thickness of the workpiece 14 is input to the NC machine 25 in step S201. Next in Step S202, the number of the axis to be corrected is input to the NC machine 25. In case the slant of the wire electrode is corrected only in one axis direction, X-axis (U-axis) or Y-axis (V-axis), "1" is input, and in case of two axis directions, X-axis (U-axis) and Y-axis (V-axis), "2" is input. In Step S203, a position to start correcting is input. At this time, it is instructed whether to start the correction from the present position or to start from a different position after shifting the table 2 either in the X-axis or Y-axis direction. If the slant of the wire electrode is corrected in the two axis directions, the starting position for the second axis is also input. These values are input using the coordinate values or moving amount of the table. Further, it is instructed whether to shift the table in the second axis direction through the shortest distance or to shift the table in the second axis direction so as to evade collision between the wire electrode and the workpiece 14. In case of evading the collision, it is instructed whether to specify a moving amount and move the table based thereon or to input coordinate values and move it via these points.

The procedure proceeds to Step S204, and the wire electrode 1 is stretched between the upper wire electrode guide 3 and the lower wire electrode guide 4. Then, the procedure proceeds to Step S205. Electric discharge is performed to the end face position of the workpiece 14, and the end face position of the workpiece 14 is detected to determine a place for applying electric discharge voltage for checking verticality of the wire electrode. Then, the procedure proceeds to Step S206 and the wire electrode is moved back relatively from the end face position of the table 2 detected in Step S205 by a prescribed amount by shifting the table 2, so as to apply an electric discharge voltage for checking the verticality of the wire electrode 1. Next, the procedure proceeds to Step S207, an electric discharge voltage is applied, and the wire electrode 1 approaches the workpiece 14 fixed on the table 2 from the X-axis direction while being moved slowly. In this operation, when a specified time period or specified number of times of discharge is detected between the wire electrode 1 and the workpiece 14, the X-axis motor 5 stops rotating and the wire electrode 1 stops approaching the workpiece 14 from the X-axis direction.

The procedure proceeds to Step S208, and discharge positions are detected in each discharge during the predetermined fixed time period or predetermined fixed number of time. Then, in Step S209, the slant of the wire electrode 1 relative to the workpiece 14 is calculated based on the discharge position detected in Step S208. The procedure proceeds to Step S210, and the correction amount is calculated based on the slant of the wire electrode 1 calculated in Step S209. Next, in Step S211, the slant of the wire electrode 1 is corrected based on the correction amount calculated in Step S210. In Step S212, it is decided whether the axis which has been corrected is the first one or not. If it is decided in Step S212 that the correction is made for the first one, the procedure proceeds to Step S213 and it is decided whether only one axis should be corrected or not, that is, whether the second axis should be also corrected or not, based on the number of the axis input in Step S202. If it is decided in Step S213 that the number of the axis to be corrected is 2, the procedure proceeds to Step S214 and the wire electrode 1 is cut off. This is a process to prevent the wire electrode 1 from interfering with the workpiece 14, e.g., being caught thereon, so as to avoid the workpiece 14 from moving or the wire electrode 1 from breaking off when shifting the wire electrode 1 in next Step S215 to the start position for correcting the second axis which has been input in Step S203. Then, the procedure proceeds to Step S215, and the table 2 is shifted to the start position for correcting the second axis which has been input in Step S203 by rotating the X-axis motor 5 and the Y-axis motor 6. After that, the procedure returns to Step S204 and the same process is repeated. If it is decided in Step S212 that it is the second axis, or decided in Step S213 that the number of the axis to be corrected is one the above program is ended.

As a specific example, a process in case of the axes to be corrected being two is described based on the flowchart of FIG. 3.

In Step S201, the thickness of the workpiece 14 is input. In Step S202, "2" is input as the number of the axes to be corrected. In Step S203, the starting positions for correcting the first axis and the second axis and a path of movement from the first axis to the second axis are input into the NC means 25. In Step S204, the wire electrode 1 is stretched. In Step S205, the table 2 is moved in the X-axis direction, so that the workpiece 14 fixed on the table 2 approaches the wire electrode 1. Then, the contact point of the wire electrode 1 and the workpiece 14 is detected by the position detecting means 11. In Step S206, the workpiece 14 fixed on the table 2 is moved back a prescribed amount in the X-axis direction from the contact point of the wire electrode 1 and the workpiece 14. In Step S207, discharge voltage is applied, and the wire electrode 1 relatively approaches the workpiece 14 fixed on the table 2 while being moved slowly. In Step S208, when the predetermined time period or predetermined number of times of discharge is detected between the wire electrode 1 and the workpiece 14, the X-axis motor 5 stops rotating and the wire electrode 1 stops approaching the workpiece 14 in the X-axis direction. That is, discharge positions are detected for each discharge during the specified fixed time period or the specified fixed number of times within the time period until the wire electrode 1 stops approaching the workpiece 14 in the X-axis direction by stopping rotating the X-axis motor 5.

Next, in Step S209, the slant of the wire electrode 1 relative to the workpiece 14 is calculated. In Step S210, the correction amount of the slant of the wire electrode 1 relative to the workpiece 14 is calculated, then the value is stored in the discharge position storage means 24. In Step S211, the slant is corrected by rotating the U-axis motor 7 based on the correction amount stored in the discharge position storage means 24. The number of times of correction in Step S211 is restricted to once per axis. In step S212, it is decided whether the axis which has been corrected is the first axis or not. In Step S213, it is decided whether only one axis should be corrected or not. In this case, it is required to correct the slant in another axis direction. Therefore, the wire electrode 1 is cut off in Step S214. In Step S215, the wire electrode 1 is moved relatively to the workpiece 14 by the prescribed moving amount by rotating the X-axis motor 5 and the Y-axis motor 6. In this way, in the same procedure for the first axis correction, the moving direction of the electrode 1 is changed from the X-axis direction to the Y-axis direction, while the correcting direction of the slant is changed from U-axis direction to the V-axis direction, so that the slant of the wire electrode 1 relative to the workpiece 14 is corrected. After that, it is decided in Step S212 whether the axis which has been corrected is the first axis or not. In this case, the correction is for the second one, so that this process is ended.

Referring to FIG. 4, a theory for calculating the correction amount of the slant of the wire electrode 1 to a reference surface of the workpiece 14 is described hereafter.

In FIG. 4, 1 indicates the wire electrode, 14 is the workpiece, 40 is the thickness of the workpiece 14 which is previously specified, 41 is a discharge upper end, 42 is a discharge lower end, 43 is a discharge width defined between the discharge upper end 41 and the discharge lower end 42 in the direction of the thickness 40, 44 is a difference of a discharge distance between the discharge upper end 41 and the discharge lower end 42 in the X-axis direction and the Y-axis direction, 45 is a wire electrode slant (angle=θ), and 49 is a correction value (correction amount=δ).

The operation thereof will now be described.

As shown in FIG. 4, as the wire electrode 1 relatively approaches the workpiece 14 fixed on the table 2, there takes place discharge between the workpiece 14 and the wire electrode 1 at the position where the distance therebetween becomes a certain value. The wire electrode 1 is kept moving toward the workpiece 14 until a discharge is generated for a predetermined time period or a predetermined number of times. The discharge position, which is defined as a vertically extending area between the wire electrode 1 and the workpiece 14 fixed on the table 2, is measured for the above predetermined time period or number of times of discharge. The vertical distance between the upper position 41 and the lower position 42 of the discharge are stored as the discharge width 43 in the discharge position storage means 24. The approach of the wire electrode 1 to the workpiece 14 continues until after the fixed time period or the fixed number of times of discharge. The moving distance during the discharge is generated is set as the difference 44 between the discharge distance at the discharge start point and the discharge distance at the discharge end point. The slant of the wire electrode 1 is calculated by a wire electrode slant computing unit 28, on the basis of the difference 44 of the discharge distances and the discharge width 43. Then, the correction value 49 is calculated on the basis of the thickness 40 of the workpiece 14, which is previously specified, and the slant of the wire electrode 1, and the correction is carried out.

Next, it is described how to calculate the wire electrode slant 45 (angle =θ) relative to the table 2 and the correction value 49, referring to FIG. 4. Using the discharge width 43 and the difference 44 of the discharge distances, the slant angle θ of the wire electrode 1 relative to the workpiece 14 fixed on the table 2 is calculated as follows:

$\tan\theta$=(difference 44 of the discharge distance)/(discharge width 43)

When the value of $\tan\theta$ is calculated, the workpiece thickness 40 is the numerator and the correction value 49 the denominator, so that the correction amount δ is calculated as follows;

δ=(difference of the discharge distance 44)×(workpiece thickness 40)/(discharge width 43)

As mentioned above, the wire electrode discharge machine of the present embodiment comprises: working fluid supplying means 38 for supplying working fluid between a wire electrode 1 and a workpiece 14; a machining power source 26 for applying a voltage to generate a discharge between the wire electrode 1 and the workpiece 14 through the working fluid supplied from the working fluid supplying means 38; a table 2 capable of fixing the workpiece 14; table control means 9 for controlling movement of the table 2 in X-axis and Y-axis directions; a pair of wire electrode guides 3, 4 respectively located at the top and bottom of the workpiece 14; taper control means 10 for controlling the slant of the wire electrode 1 relative to the workpiece 14 by moving one of the wire electrode guides 3, 4 in U-axis and V-axis directions; the discharge position detecting means 21 for detecting the discharge position between the wire electrode 1 and the workpiece 14 based on the current supplied through an upper power supplying line 17 and a lower power supplying line 18 from the machining power source 26 to the wire electrode 1; measuring means, constituted by the NC means 25, for measuring the discharge position, for a prescribed time period, detected by the discharge position detecting means 21 while approaching the wire electrode 1 to the workpiece 14; discharge width computing means 29 for calculating the distance between the upper end and the lower end of the discharge position as a discharge width in the thickness direction of the workpiece 14; and correcting amount computing means, constituted by the NC means 25, for calculating a correcting amount for correcting the slant of the wire electrode 1 relative to the workpiece 14 based on the discharge width calculated by the discharge width computing means 29, the thickness of the workpiece 14 and the discharge position detected by the discharge position detecting means 21. The invention also encompasses the method for wire electrode discharge machining by which the above apparatus operates.

Accordingly, voltage is applied, by the machining power source 26, to generate a discharge through the working fluid supplied between the wire electrode 1 and the workpiece 14 from the working fluid supplying means 38. The movement, in the X-axis direction and the Y-axis direction, of the table 2 on which the workpiece 1 is fixed is controlled by the table control means 25. The slant of the wire electrode 1 relative to the workpiece 14 is controlled by the taper control means 10 by moving, in the U-axis direction and the V-axis direction, one of a pair of wire electrode guides 3, 4 respectively located at the top and the bottom of the workpiece 14. The discharge position between the wire electrode 1 and the workpiece 14 is detected by the discharge position detecting means 21 based on the current supplied from the machining power source 26 to the wire electrode 1. The discharge position is measured, by the NC means 25 as the measuring means, for a prescribed time period while approaching the wire electrode 1 to the workpiece 14. The distance between the upper end and the lower end of the discharge position is calculated as a discharge width in the thickness direction of the workpiece 14, by the discharge width computing means 29. A correcting amount for correcting the slant of the wire electrode 1 relative to the workpiece 14 is calculated based on the discharge width, the thickness of the workpiece 14 and the discharge position, in the NC means 25 as the correcting amount computing means.

Therefore, it is possible to correct the slant of the wire electrode 1 relative to the workpiece 14 directly by using the wire electrode 1. In addition, it is possible to correct the slant of the wire electrode 1 relative to the workpiece 14 quickly. As a result, it is possible to drastically reduce the time necessary for fixing the workpiece 14 on the table 2 because of the reduced accuracy required, as well as the time necessary for arrangements such as the verticality checking of workpiece of the wire electrode 1 by discharge.

Another technique for calculating the correction amount of the slant of the wire electrode 1 relative to the workpiece 14 will be described referring to FIG. 5.

Figure 5:
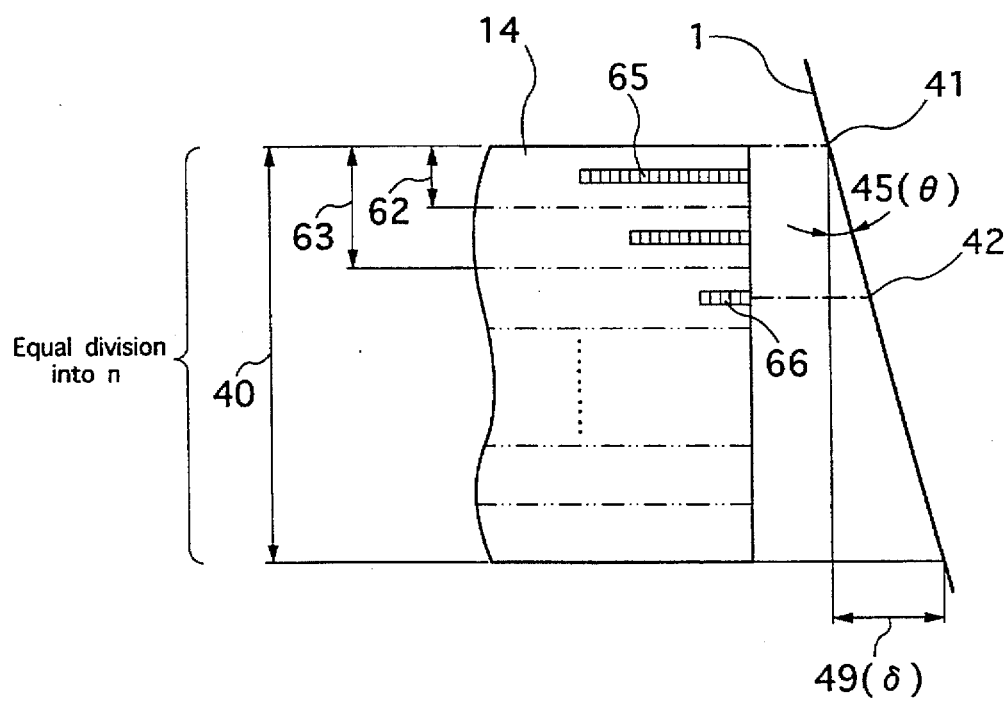
FIG. 5 is an explanatory drawing showing another theory to calculate a slant correcting amount of a wire electrode to a workpiece in the wire electrode discharge machine according to the second embodiment of the present invention.

In FIG. 5, reference numeral 1 is the wire electrode, 14 is the workpiece, 40 is the thickness of the workpiece 14 which is previously indicated, 41 is the discharge upper end, 42 is the discharge lower end, 45 is the wire electrode slant (angle=θ), and 49 is the correction value (correction amount=δ). Reference numeral 62 is a one-division width of the thickness 40 of the workpiece 14, which is divided into "n" equal parts for calculation in the NC means 25. Reference numeral 63 is a discharge generating division length or area which is defined between the an upper end to a lower end of divided parts 62 where the discharge occurs, within the divisions of the thickness 40 of the workpiece 14 divided into "n" equal parts for the calculation in the NC means 25. 65 is a number of times of discharge at the upper end part among the divisions, which is shown by a bar graph from the right end face, of the thickness 40 of the workpiece 14 divided into "n" equal parts for the calculation in the NC means 25. 66 is a number of times of discharge at the lower end part among the divisions, which is shown by a bar graph from the right end face, of the discharge generating area of the thickness 40 of the workpiece 14 divided into "n" equal parts for the calculation in the NC means 25.

The operation is described hereunder.

As shown in FIG. 5, the thickness 40 of the workpiece 14 is divided into the prescribed number at equal intervals in the Z-axis, direction which is perpendicular to the X-axis and Y-axis. When the wire electrode 1 is moved toward the workpiece 14 fixed on the table 2, discharge occurs between the wire electrode 1 and the workpiece 14 at a certain distance. The wire electrode 1 continues to be moved toward the workpiece 14 until the end of the predetermined time period or the predetermined number of times of discharge. Discharge positions defined between the wire electrode 1 and the workpiece 14 fixed on the table 2 are measured for the prescribed time period or prescribed number of times. Then, it is counted how many time the discharge is generated at each division, and the value is stored in the discharge position storage means 24. The slant 45 of the wire electrode 1 is calculated by the wire electrode slant computing unit 28 based on the thickness 40 of the workpiece 14, which is previously specified, the number of divisions and the number of times of discharge at each division. The correction value 49 is calculated from the thickness 40 and the slant 45 of the wire electrode 1 so as to correct the slant.

Referring to FIG. 5, it is describe how to calculate the electrode slant 45 (angle=θ) relative to the table 2 and the correction value 49 (correction amount=δ).

Using the difference between the upper end discharge times 65, which corresponds to the uppermost part among the parts equally divided into "n" for the calculation in the NC means 25, and the lower end discharge times 66, which corresponds to the lowermost one of the discharge generating parts among the parts equally divided into "n" for the calculation in the NC means 25, and the thickness 40 of the workpiece 14, which is a length of the parts from the upper end of the workpiece 14 to the discharge generating lower end part among the parts equally divided into "n" for the calculation in the NC means 25, the slant angle θ of the wire electrode 1 to the workpiece 14 fixed on the table 2 is calculated as follows. K in the equation indicates a proportional constant.

$\tan\theta = K \times \{(\text{upper end discharge times 65}) - (\text{lower end discharge times 66})\} / (\text{discharge generating division length 63})$ When the tan θ is calculated, the workpiece thickness 40 is the numerator and the correction value 49 is the denominator, so that the correction amount δ is calculated as follows:

$\delta = K \times \{(\text{upper end discharge times 65}) - (\text{lower end discharge times 66})\} \times (\text{thickness 40}) / (\text{discharge generating division length 63})$ As mentioned above, the wire electrode discharge machine of the present embodiment comprises: working fluid supplying means 38 for supplying working fluid between a wire electrode 1 and a workpiece 14; a machining power source 26 for applying a voltage to generate a discharge between the wire electrode 1 and the workpiece 14 through the working fluid supplied from the working fluid supplying means 38; a table 2 capable of fixing the workpiece 14; table control means 9 for controlling movement of the table 2 in X-axis and Y-axis directions; a pair of wire electrode guides 3, 4 respectively located at the top and bottom of the workpiece 14; taper control means 10 for controlling the slant of the wire electrode 1 relative to the workpiece 14 by moving one of the wire electrode guides 3, 4 in U-axis and V-axis directions; the discharge position detecting means 21 for detecting the discharge position between the wire electrode 1 and the workpiece 14 based on the current supplied through an upper power supplying line 17 and a lower power supplying line 18 from the machining power source 26 to the wire electrode 1; measuring means, constituted by the NC means 25, for measuring the discharge position, for a prescribed time period, detected by the discharge position detecting means 21 while approaching the wire electrode 1 to the workpiece 14; counting means, constituted by an NC means 25, for equally dividing the thickness of the workpiece 14 into a number specified in a predetermined program and counting a number of times of discharge at each of divided parts of the workpiece 14; and a correcting amount computing means, constituted by the NC means 25, for calculating correcting amount for correcting the slant of the wire electrode 1 relative to the workpiece 14 based on the number of times of discharge counted by the counting means, the thickness of the workpiece 14 and the discharge position detected by the discharge position detecting means 21. Moreover, the invention also encompasses the method for wire electrode discharge machining by which the above apparatus operates.

Accordingly, voltage is applied, by the machining power source 26, to generate a discharge through working fluid supplied between the wire electrode 1 and the workpiece 14 from the working fluid supplying means 38. The movement, in the X-axis direction and the Y-axis direction, of the table 2 on which the workpiece 1 is fixed is controlled by the table control means 25. The slant of the wire electrode 1 relative to the workpiece 14 is controlled by the taper control means 10 by moving, in the U-axis direction and the V-axis direction, one of a pair of wire electrode guides 3, 4 respectively located at the top and the bottom of the workpiece 14. The discharge position between the wire electrode 1 and the workpiece 14 is detected by the discharge position detecting means 21 based on the current supplied from the machining power source 26 to the wire electrode 1. The discharge position is measured, by the NC means 25 as the measuring means, for a prescribed time period while approaching the wire electrode 1 to the workpiece 14. The thickness of the workpiece 14 is equally divided into a number specified in a predetermined program and a number of times of discharge is counted at each of divided parts of the workpiece 14, in the NC means 25 as the counting means. A correcting amount for correcting the slant of the wire electrode 1 relative to the workpiece 14 is calculated based on the number of times of discharge, the thickness of the workpiece 14 and the discharge position, in the NC means as the correcting amount computing means.

Therefore, it is possible to correct the slant of the wire electrode 1 relative to the workpiece 14 directly by using the wire electrode 1. In addition, it is possible to correct the slant of the wire electrode 1 relative to the workpiece 14 quickly. As a result, it is possible to drastically reduce time necessary for getting accuracy when the workpiece 14 is fixed on the table 2 and time necessary for arrangements such as the verticality checking workpiece of the wire electrode 1 by discharge.

Third Embodiment

Figure 6A:
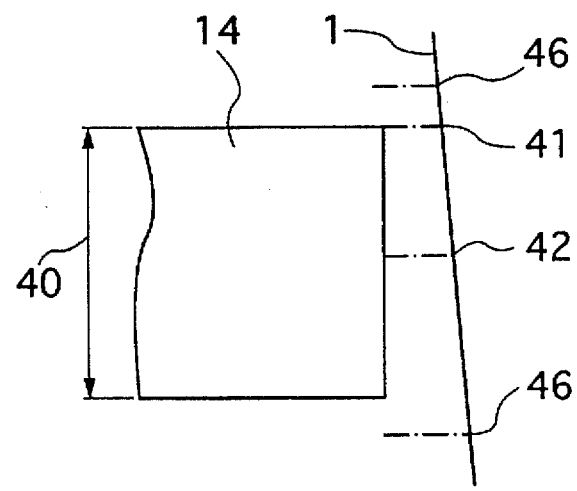
FIGS. 6a, 6b and 6c are explanatory drawings showing a method to exclude an irregular discharge in a wire electrode discharge machine according to a third embodiment of the present invention.
Figure 6B:
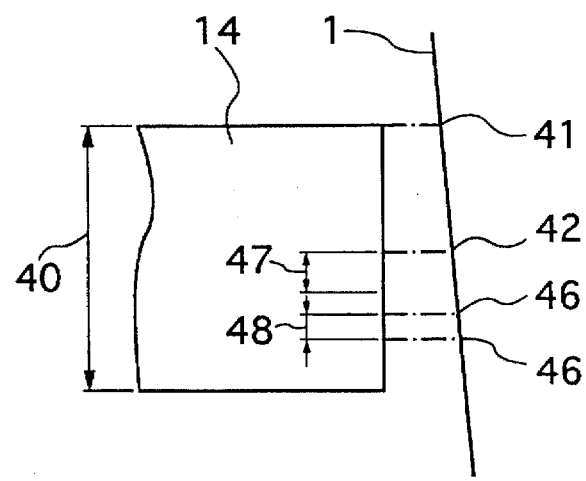
Figure 6C:
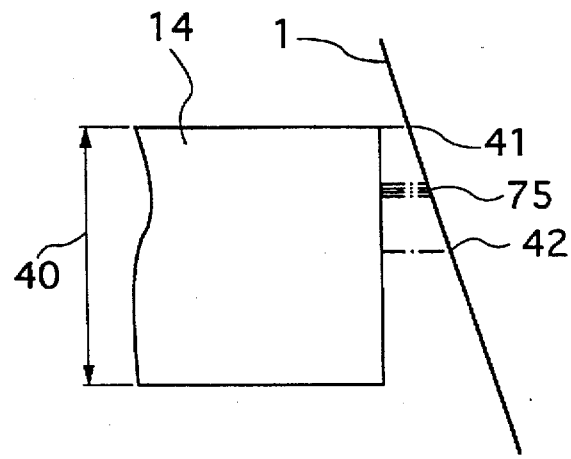

FIGS. 6a, 6b and 6c are explanatory drawings which show a procedure for excluding an irregular or abnormal discharge in a wire electrode discharge machine according to a third embodiment of the present invention. The structure of the wire electrode discharge machine is the same as that of FIG. 1, therefore the detailed description of the structure is omitted, and FIG. 1 may be referred to if required.

In FIGS. 6a, 6b and 6c, 1 is a wire electrode, 14 is a workpiece, 40 is the thickness of the workpiece 14, 41 is a discharge upper end, 42 is a discharge lower end, 46 is an irregular discharge point for detecting irregular discharge, 47 is a specified width, 48 is an irregular discharge width which is a width where the irregular discharge is detected, and 75 is concentrated discharge.

The operation of this wire electrode discharge machine is described hereunder referring to FIGS. 6a, 6b and 6c.

FIG. 6a shows irregular discharge points 46 which are located outside the workpiece 14 (outside of the thickness 40). In the data of the discharge positions measured for the prescribed time period or prescribed number of times of discharge, the upper and lower end positions of the workpiece 14 are stored based on the thickness 40 of the workpiece 14 which is previously specified. If the irregular discharge points 46 are detected above the upper end or under the lower end of the workpiece 14, these points are recognized as irregular values, and they are excluded from the data for calculating the slant angle of the wire electrode 1 when checking its verticality relative to the workpiece.

FIG. 6b shows irregular discharge points 46 which are located inside the workpiece 14 (inside the thickness 40). In the data of the discharge positions measured for the prescribed time period or prescribed number of times of discharge, the upper and lower end positions of the workpiece 14 are stored based on the thickness 40 of the workpiece 14 which is previously specified. If an irregular discharge point 46 is detected above the upper end or under the lower end of the workpiece 14 while such a point 46 is far from the prescribed specified width 47, the discharge point 46 is recognized as an irregular discharge point, and it is excluded from the data for calculating the slant angle of the wire electrode 1 when checking its verticality to the workpiece 14. Even if there are two irregular discharge point intervals spaced less than the specified width 47, when the interval or an irregular discharge width 48 is distant from the specified width 47, these points 46 are recognized as irregular values and are excluded from the data for calculating the slant angle of the wire electrode 1 when checking the verticality to the workpiece 14.

FIG. 6c shows a concentrated discharge 75. If discharges occur successively more than prescribed number of times at the same discharge position, they are recognized as irregular discharge, and the discharge and the shift of the axis are stopped for a certain period of time. Then, the discharge and shift of the axis are performed until the prescribed time period or a prescribed number of times of discharge has occurred. The discharges recognized as irregular discharges are excluded from the data for calculating the slant of the wire electrode 1.

As mentioned above, in addition to the structure in the above-described first and second embodiments, the wire electrode discharge machine of the present embodiment further comprises: irregular discharge detecting means, constituted by an NC means 25, for detecting a concentrated discharge as an irregular discharge if the concentrated discharge is generated in detecting the discharge position by the discharge position detecting means 21; and a correcting amount excluding means, constituted by the NC means 25, for excluding the irregular discharge from the correcting amount calculated by the correction amount computing means, constituted by the NC means 25, when the irregular discharge is detected by the irregular discharge detecting means. Moreover, the invention also encompasses the method for wire electrode discharge machining by which the above apparatus operates.

Accordingly, the irregular discharge detected by the irregular discharge detecting means, due to the concentrated discharge 75, is excluded from the correcting amount, which is calculated by the NC means 25 as the correcting amount computing means.

Therefore, it is possible to detect the discharge position with higher accuracy by excluding the irregular discharge due to the concentrated discharge 75.

Fourth Embodiment

Figure 7:
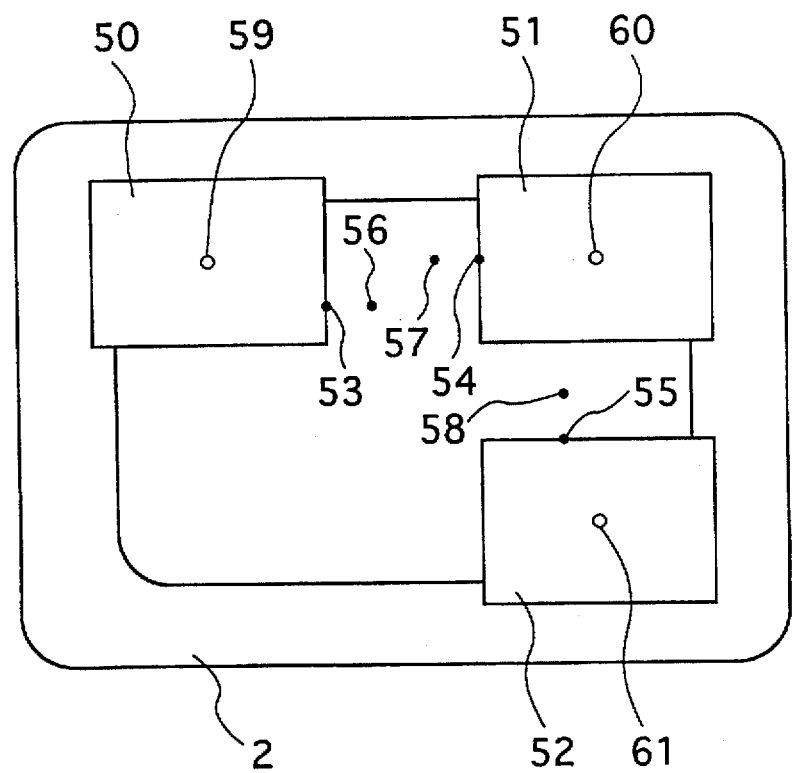
FIG. 7 is a top plan view showing plural workpieces fixed on a table in a wire electrode discharge machine according to a fourth embodiment of the present invention.

FIG. 7 is a top plan view which shows plural workpieces fixed on a table 2 of a wire electrode discharge machine according to a fourth embodiment of the present invention. The basic arrangement of the wire electrode discharge machine is the same as that of FIG. 1, and therefore the detailed description of the mechanism is omitted, and FIG. 1 may be referred to if required.

In FIG. 7, reference numerals 50, 51 and 52 are workpieces, 53 shows a correcting amount of the workpiece 50, 54 shows a correcting amount of the workpiece 51. Reference numeral 55 denotes a correcting amount of the workpiece 52. Reference numeral 56 shows a discharge start position for checking the verticality to the workpiece 50 by discharge, 57 shows a discharge start position for checking the verticality to the workpiece 51 by discharge, 58 shows a discharge start position for checking the verticality to the workpiece 52 by discharge, 59 shows a machining start position of the workpiece 50, 60 shows a machining start position of the workpiece 51, and 61 shows a machining start position of the workpiece 52.

A plurality of workpieces 50, 51 and 52 are fixed on the table 2, and it is necessary to check the verticality for each workpiece by discharge. The verticality of each workpiece 50, 51, 52 is checked by discharge, and the correction amount 53, 54, 55 is set for each. The correcting amounts 53, 54 and 55 corresponding to the respective workpieces 50, 51 and 52 are stored into the discharge position storage means 24. When the machining each of the plural workpieces 50, 51 and 52 fixed on the table 2 is performed in order, the slant of a wire electrode 1 relative to each workpiece 50, 51, 52 is corrected based on each of the correcting amounts 53, 54 and 55 stored in the discharge position storage means 24.

Figure 8:
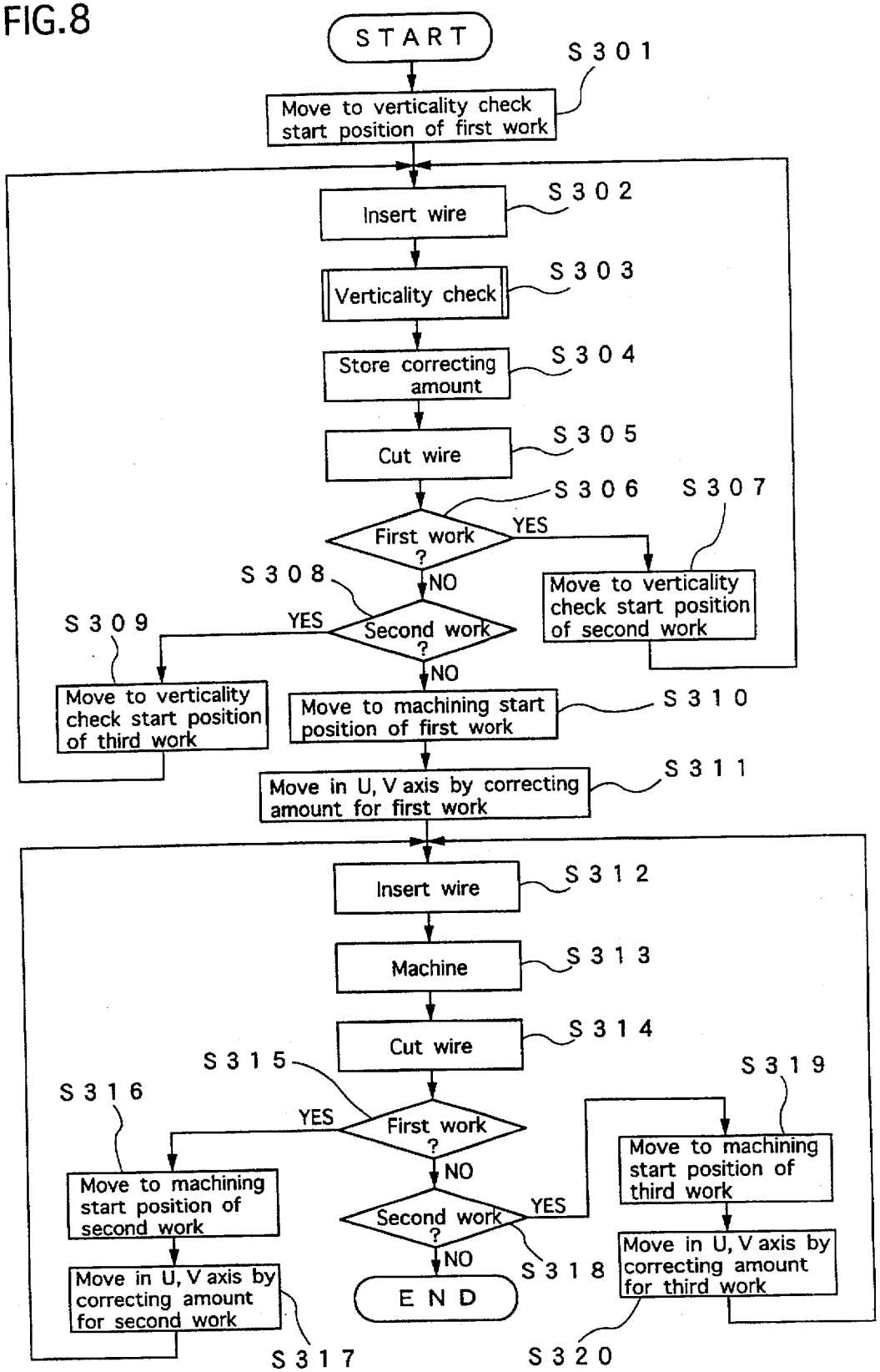
FIG. 8 is a flow chart showing a procedure by an NC machine of the wire electrode discharge machine according to the fourth embodiment of the present invention.

The operation of the wire electrode discharge machine according to the present embodiment is described based on the flow chart of FIG. 8 while referring to FIG. 1, FIG. 2, FIG. 3 and FIG. 7. FIG. 8 shows a case in which, after the verticality check is carried out for all workpieces by discharge, all the workpieces are machined by electric discharge machining. The whole operation in FIG. 8 is automatically performed on the basis of prespecified values the NC means 25. The discharge start positions for checking the verticality for each workpiece, and the machining start positions for each workpiece are input beforehand. As shown in FIG. 7, the plural workpieces 50, 51 and 52 are fixed on the table 2, and machined in ascending numerical order, i.e., from the workpiece 50.

In Step S301, the X-axis motor 5 and the Y-axis motor 6 are rotated so that the table 2 is moved to the discharge start position 56 for checking the verticality for the workpiece 50. In Step S302, the wire electrode 1 is stretched between the upper wire electrode guide 3 and the lower wire electrode guide 4. In Step S303, the slant of the electrode wire 1 to the workpiece 50 is corrected according to the above-mentioned method for checking the verticality for the workpiece 50, as shown in FIG. 2 and FIG. 3. In Step S304, the correcting amount 53, which is used for correction in Step S303, is stored into the correcting amount storage means 35. In Step S305, the wire electrode 1 is cut off. This is to prevent the workpiece position from changing while avoiding the wire electrode 1 from breaking due to interference such as the wire electrode 1 being caught by the workpiece 14 at the time of a next shifting workpiece of the table 2. In Step S306, it is decided whether the workpiece for which correction has been performed is the first one or not.

If it is decided in Step S306 that the workpiece for which correction has been performed is the first one, the procedure proceeds to Step S307 for the second workpiece correction. If the workpiece is the second or third one, the procedure proceeds to Step S308. In Step S307, the X-axis motor 5 and the Y-axis motor 6 are rotated so that the table 2 is moved to the discharge start position 57 for checking the verticality of the second workpiece 51. Then, the procedure returns to Step S302 and the same procedure is repeated. In Step S308, it is decided whether the workpiece for which correction has been performed is the second one or not. If it is decided in Step S308 that the workpiece for which correction has been performed is the second one, the procedure proceeds to Step S309 for the third workpiece correction. In Step S309, the X-axis motor 5 and the Y-axis motor 6 are rotated so that the table 2 is moved to the discharge start position 58 for checking the verticality of the third workpiece 52. Then, the procedure returns to Step S302 and the same procedure is repeated.

Meanwhile, if it is decided in Step S308 that the workpiece for which correction has been performed is the third one, the procedure proceeds to Step S310 to machine the workpieces 50, 51 and 52. In Step S310, the X-axis motor 5 and the Y-axis motor 6 are rotated so that the table 2 is moved to the machine start position 59 for the first workpiece 50. In Step S311, the upper wire electrode guide 3 is moved in the U-axis direction and the Y-axis direction by the correcting amount 53 for the first workpiece 50 stored in the correcting amount storage means 35. In Step S312, the wire electrode 1 is stretched between the upper wire electrode guide 3 and the lower wire electrode guide 4. In Step S313, the workpiece is machined into the shape prescribed in the NC machine 25, and then the procedure proceeds to Step S314 to cut the wire electrode 1. This is to prevent the workpiece position from changing or avoiding the wire electrode 1 from breaking due to interference such as the wire electrode 1 being caught by the workpiece 14 at the time of the next shifting workpiece of the table 2.

In Step S315, it is decided whether the workpiece which has been machined is the first one or not. If it is decided in Step S315 that the workpiece is the first one, the procedure proceeds to Step S316 to machine second workpiece. If the machined workpiece is the second or third one, the procedure proceeds to Step S318. In Step S316, the X-axis motor 5 and the Y-axis motor 6 are rotated so that the table 2 is moved to the machining start position 60 for the second workpiece 51. In Step S317, the upper wire electrode guide 3 is moved in the U-axis direction and the Y-axis direction by the correcting amount 54 for the second workpiece 51 stored in the correcting amount storage means 35. Then, the procedure returns to Step S312 and the same procedure is repeated.

In Step S318, it is decided whether the workpiece which has been machined is the second one or not. If it is decided in Step S318 that the workpiece is the second one, the procedure proceeds to Step S319 to machine the third workpiece. If it is decided in Step S318 that the workpiece is the third one, the procedure is ended. In Step S319, the X-axis motor 5 and the Y-axis motor 6 are rotated so that the table 2 is moved to the machining start position 61 for the third workpiece 52. In Step S320, the upper wire electrode guide 3 is moved in the U-axis direction and the Y-axis direction by the correcting amount 55 for the third workpiece 52 stored in the correction amount storage means 35. Then, the procedure returns to Step S312 and the same procedure is repeated. After the decision in Step S318, the procedure is ended.

As mentioned above, the wire electrode discharge machine of this embodiment comprises: working fluid supplying means 38 for supplying working fluid between a wire electrode 1 and a workpiece 14; a machining power source 26 for applying a voltage to generate a discharge between the wire electrode 1 and the workpiece 14 through the working fluid supplied from the working fluid supplying means 38; a table 2 capable of fixing the workpiece 14; table control means 9 for controlling movement of the table 2 in X-axis and Y-axis directions; a pair of wire electrode guides 3, 4 respectively located at the top and bottom of the workpiece 14; taper control means 10 for controlling the slant of the wire electrode 1 relative to the workpiece 14 by moving one of the wire electrode guides 3, 4 in U-axis and V-axis directions; the discharge position detecting means 21 for detecting the discharge position between the wire electrode 1 and the workpiece 14 based on the current supplied through an upper power supplying line 7 and a lower power supplying line 18 from the machining power source 26 to the wire electrode 1; a wire electrode slant computing means 28 for calculating the slant of the wire electrode 1 to each of a plurality of the workpieces 50, 51, 52 based on the discharge position detected by the discharge position detecting means 21; a correcting amount computing means, constituted by an NC means 25, for calculating a correcting amount for correcting the slant of the wire electrode 1 relative to the workpiece 50, 51, 52 based on the slant of the wire electrode 1 calculated by the wire electrode slant computing means 28; a correcting amount storage means 35 for storing the correcting amount calculated by the correcting amount computing means; and a machining continuing means, constituted by the NC means 25, for continuing machining the workpiece 50, 51, 52 by recalling one of the correcting amounts stored in the correcting amount storage means 35 corresponding to the workpiece 50, 51, 52 to be machined while executing a prescribed program. Moreover, the invention also encompasses the method for wire electrode discharge machining by which the above apparatus operates.

Accordingly, voltage is applied, by the machining power source 26, to generate a discharge through working fluid supplied between the wire electrode 1 and the workpiece 14 from the working fluid supplying means 38. The movement, in the X-axis direction and the Y-axis direction, of the table 2 on which the workpiece 1 is fixed is controlled by the table control means 25. The slant of the wire electrode 1 relative to the workpiece 14 is controlled by the taper control means 10 by moving, in the U-axis direction and the V-axis direction, one of a pair of wire electrode guides 3, 4 respectively located at the top and the bottom of the workpiece 14. The discharge position between the wire electrode 1 and the workpiece 14 is detected by the discharge position detecting means 21 based on the current supplied from the machining power source to the wire electrode. The slant of the wire electrode 1 relative to each of a plurality of the workpieces 50, 51, 52 is calculated based on the discharge position, in the wire electrode slant computing means 28. A correcting amount for correcting the slant of the wire electrode 1 relative to the workpiece 50, 51, 52 is calculated based on the slant of the wire electrode 1, in the NC means 25 as the correcting amount computing means. Machining of the workpiece 50, 51, 52 is continued by recalling one of the stored correcting amounts corresponding to the workpiece 50, 51, 52 to be machined while executing a prescribed program, in the NC means 25 as the machining continuing means.

Therefore, it is possible to drastically reduce the necessary for arrangements including the time necessary for fixing the workpiece 50, 51, 52 on the table 2. In addition, even if there are plural workpieces 50, 51 and 52, automation of all processes from the verticality check of the wire electrode 1 to contour machining can be readily realized upon fixing the workpieces 50, 51 and 52 on the table 2. As a result, it is possible to obtain prolonged unmanned operations.

Fifth Embodiment

Figure 9A:
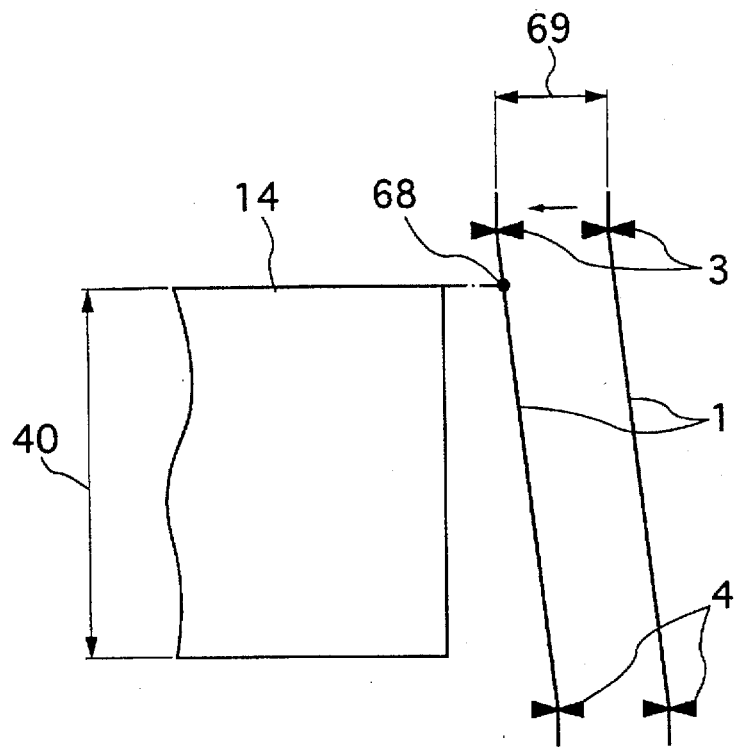
FIGS. 9a and 9b are explanatory drawings showing a way of measuring the thickness of a workpiece by a wire electrode with a certain slant in a wire electrode discharge machine according to a fifth embodiment of the present invention.
Figure 9B:
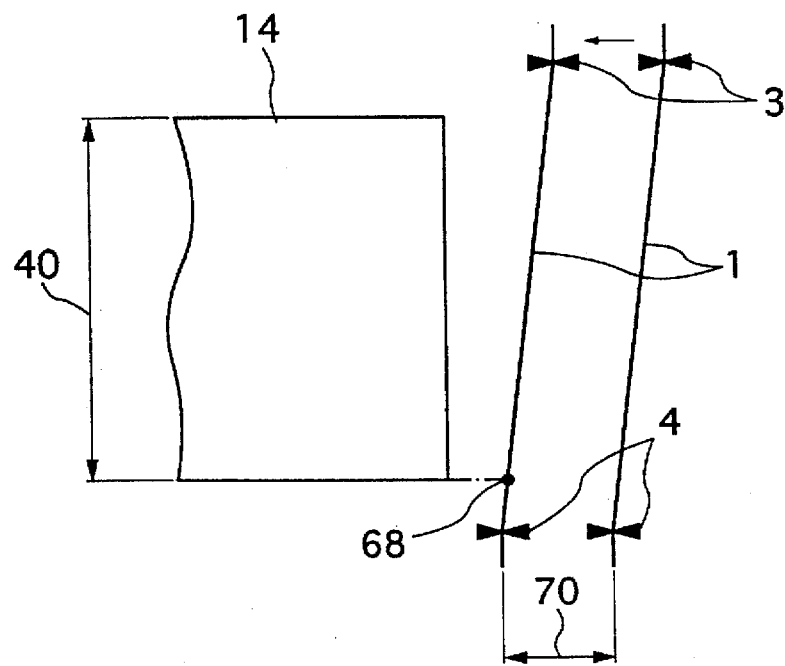

FIGS. 9a and 9b are explanatory drawings which show a procedure for measuring the thickness of a workpiece by use of a wire electrode, which is slanted to a certain amount, in a wire electrode discharge machine according to a fifth embodiment of the present invention. In FIGS. 9a and 9b, a wire electrode 1 is moved toward a workpiece 14 in the direction of the arrow, from right to left. The overall structure of the wire electrode discharge machine of the present embodiment is the same as that of FIG. 1, and therefore a further detailed description thereof is omitted, and FIG. 1 may be referred to if required.

In FIGS. 9a and 9b, 1 is a wire electrode, 3 is an upper wire electrode guide, 4 is a lower wire electrode guide, 14 is a workpiece, 68 is a discharge point, and 69 and 70 show shifting amounts, respectively.

Referring to FIGS. 9a and 9b, the operation of the above machine is described hereafter.

As shown in FIG. 9a, the wire electrode 1 is slanted by a prescribed amount. The wire electrode 1 is initially positioned on the right of the workpiece 14, and shifted in the direction of the arrow. The moving direction is restricted in either the X-axis or Y-axis direction. When the wire electrode 1 is moved in one of the X-axis and Y-axis directions by the moving amount 69, the first discharge takes place between the wire electrode 1 and the workpiece 14 at the discharge point 68. The discharge position in this discharge point 68 is stored in the discharge position storage means 24. Then, the wire electrode 1 is moved to the initial rightward position and slanted back by the above prescribed amount to be straight upward.

Then, as shown in FIG. 9b, the wire electrode 1 is inclined in the opposite direction to the first slant by the same prescribed amount as the first slant. Then, it is shifted to the direction of the arrow. After that, the procedure shown in FIG. 9a is repeated, and the discharge position of the discharge point 68 is stored in the discharge position storage means 24. The distance of two discharge points 68 is calculated by the discharge width computing means 29, and the calculation result is recognized as the thickness 40 of the workpiece 14. Since the difference of the shifting amounts 69 and 70 corresponds to the slant amount of the wire electrode 1 to the workpiece 14, the difference of the shifting amounts 69 and 70 is regarded as the correcting amount and correction is performed based on that.

As mentioned above, in addition to the structure in the above mentioned first or second embodiment, the wire electrode discharge machine of the present embodiment further comprises: The discharge position storage means 24 for moving the upper wire electrode guide 3 in the U-axis and V-axis directions to slant the wire electrode 1 so as to generate the discharge between the wire electrode 1 and the workpiece 14, and storing the discharge position detected by the discharge position detecting means 21; and workpiece thickness computing means, constituted by an NC means 25, for calculating the thickness of the workpiece 14 based on the discharge position stored in the discharge position storage means 24. Moreover, the invention also encompasses the method for wire electrode discharge machining by which the above apparatus operates.

Accordingly, the discharge position, which is detected by the discharge generated between the wire electrode 1 and the workpiece 14 by moving the upper wire electrode guide 3 in the U-axis and V-axis directions to slant the wire electrode 1, is stored. Then, the workpiece thickness is calculated from the discharge position in the NC means 25 as the workpiece thickness computing means.

As a result, the workpiece thickness is calculated automatically. Therefore, the verticality check of the wire electrode 1, which was conventionally operated after measuring correctly the workpiece thickness and specifying it, can be carried out in a series of operations, so that it is possible to improve accuracy. In addition, the slant of the wire electrode 1 relative to the workpiece 14 can be corrected at the same time with detecting the discharge position.

Sixth Embodiment

Figure 10:
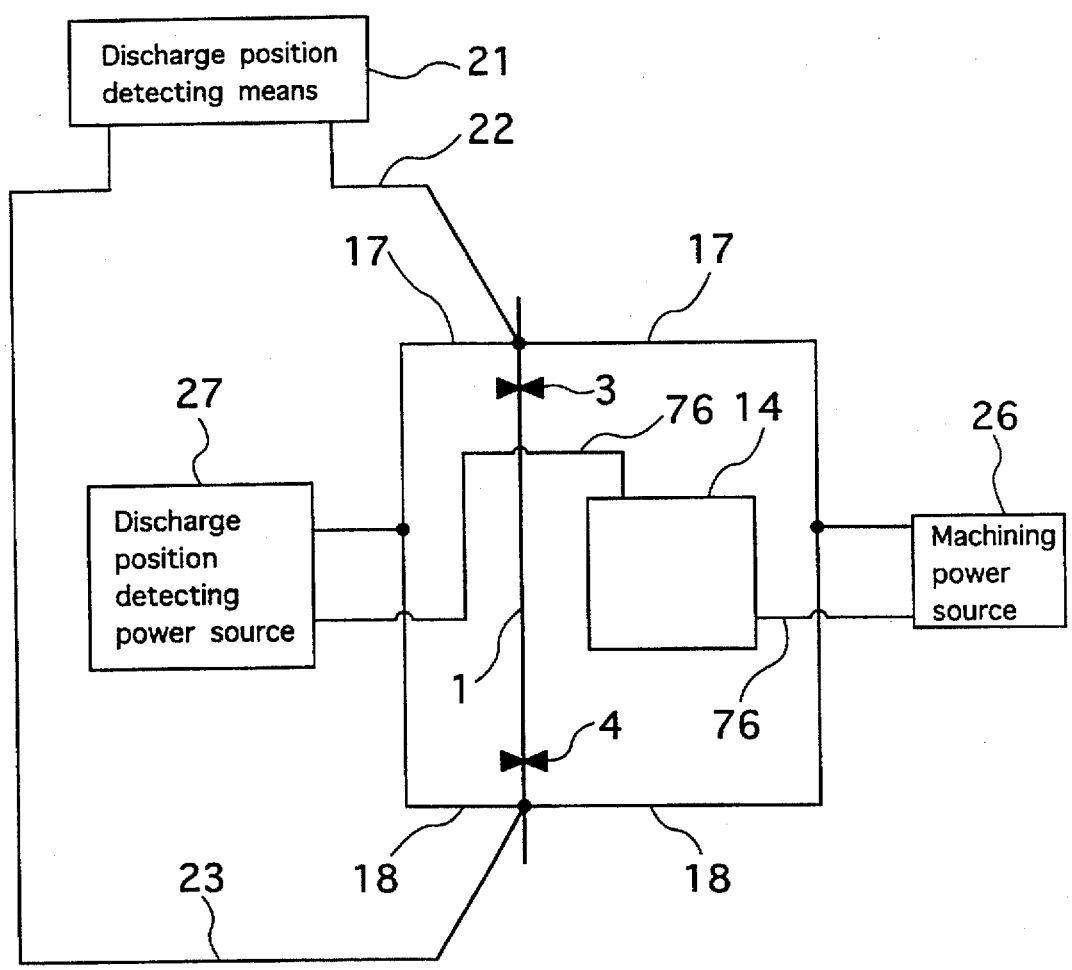
FIG. 10 is an explanatory drawing showing two power sources and a workpiece in a wire electrode discharge machine according to a sixth embodiment of the present invention.

FIG. 10 is an explanatory drawing which shows two power sources and a workpiece of a wire electrode discharge machine according to a sixth embodiment of the present invention. The overall structure of the wire electrode discharge machine is same as that of FIG. 1, therefore a further detailed description of the structure is omitted, and FIG. 1 may be referred to if required.

In FIG. 10, reference numeral 1 is a wire electrode, 3 is an upper wire electrode guide, 4 is a lower wire electrode guide, 14 is a workpiece, 17 is an upper power supplying line, 18 is a lower power supplying line, 21 is the discharge position detecting means, 22 is an upper signal line, 23 is a lower signal line, 26 is a machining power source, 27 is the discharge position detecting power source, and 76 is a workpiece side power supplying line.

Figure 11A:
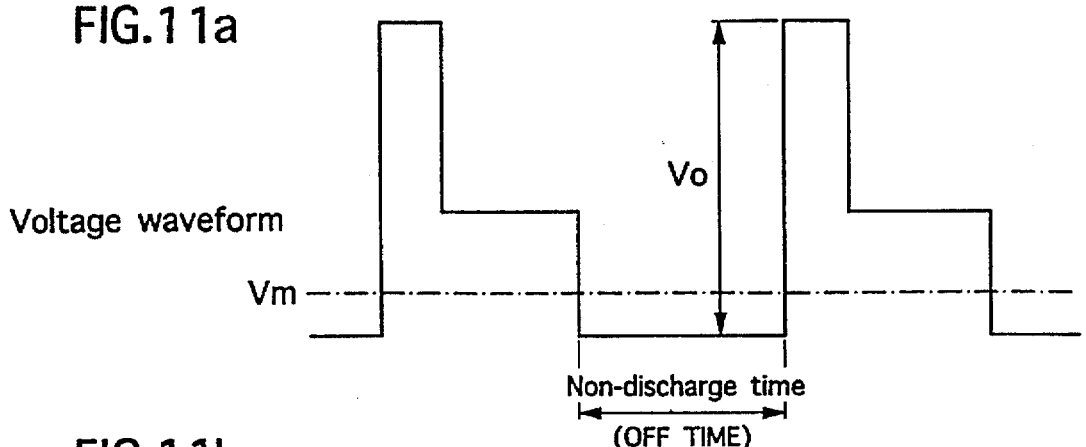
FIG. 11 is a graph showing a voltage waveform and a current waveform in FIG. 10.
Figure 11B:
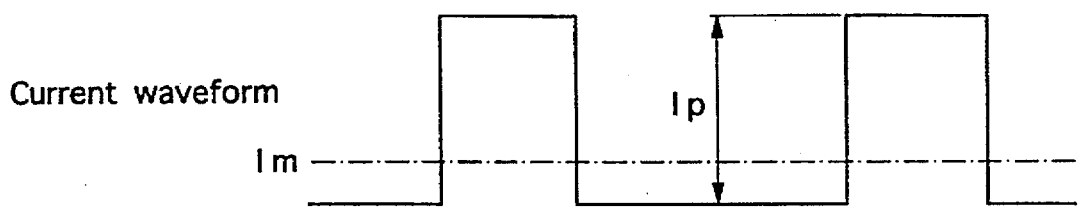

FIG. 11 is a graph showing a voltage waveform and a current waveform in the wire electrode discharge machining of FIG. 10.

Vo indicates a power source voltage in insulated state, Vm is an average machining voltage, OFF TIME indicates a non-discharge time interval between an end of one discharge operation and a start of the next power source voltage Vo applied, IP is a current peak value when the insulation is broken and the discharge is generated, and Im is an average machining current.

Machining energy for the wire electrode discharge machining refers to a value obtained by multiplying the average machining voltage Vm by the average machining current Im. In order to obtain high machining energy adequate for machining, the average machining voltage Vm or the average machining current Im is kept high. In order to keep the average machining voltage Vm high, it is necessary to increase the power source voltage Vo and reduce the OFF TIME. In order to keep the average machining current Im high, it is necessary to increase the current peak IP and reduce the OFF TIME. When checking the verticality of the wire electrode 1 to a reference surface, an adequate machining energy for detecting the accurate discharge position with less damage to the reference plane is as follows: Namely, it is necessary to keep the machining energy as low as possible not to damage the reference plane, and keep the current peak IP as high as possible to detect the accurate discharge position.

Figure 12:
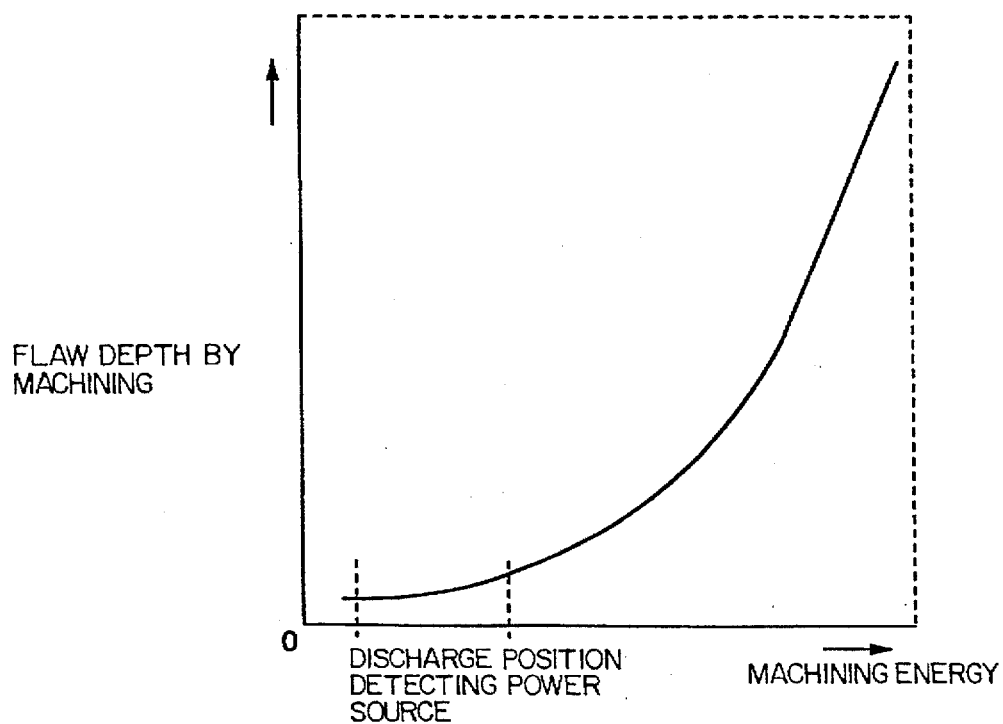
FIG. 12 is a graph showing a relation between a flaw made by discharge for verticality checking and a machining energy in the wire electrode discharge machine according to the sixth embodiment of the present invention.

FIG. 12 is a graph showing the relation between a discharge gap and the machining energy in the verticality check by discharge in the wire electrode discharge machining of FIG. 10.

The machining power source 26 is suitable for machining products because of its great volume of machining energy. However, a flaw-like a scratch on the machined surface becomes deep when checking the verticality to the workpiece. Therefore, this is not suitable for the purpose of protecting the surface for the vertical check from damage. On the other hand, the discharge position detecting power source 27 is suitable this purpose since flaws in the verticality check by discharge are shallow because of a small machining energy. However, this is not suitable for machining. Each of the power sources 26 and 27 is not suitable in a sense in checking the verticality or in machining. However, each power source is not limited to one use, but may serve for both uses, so that each of them may be chosen and used.

As mentioned above, in addition to the structure in the above mentioned first or second embodiment, the wire electrode discharge machine in the present embodiment can be an embodiment further comprising: the discharge position detecting power source 27, for a contour machining, for supplying power for less amount of machining per unit time compared to the machining power source 26.

Accordingly, since it comprises the discharge position detecting power source 27, for a contour machining, for supplying power for less amount of machining per unit time compared to the machining power source 26, it is possible to check the verticality of the wire electrode 1 by discharge with little damage on a machining surface. In addition, one of two machining power sources 26 and 27 can be selected optionally, so that it is possible to select them freely to check the vertically by discharge while machining contour. Moreover, it is possible to correct the slant of the wire electrode 1 relative to the workpiece 14 according to conditions.

Seventh Embodiment

Figure 13:
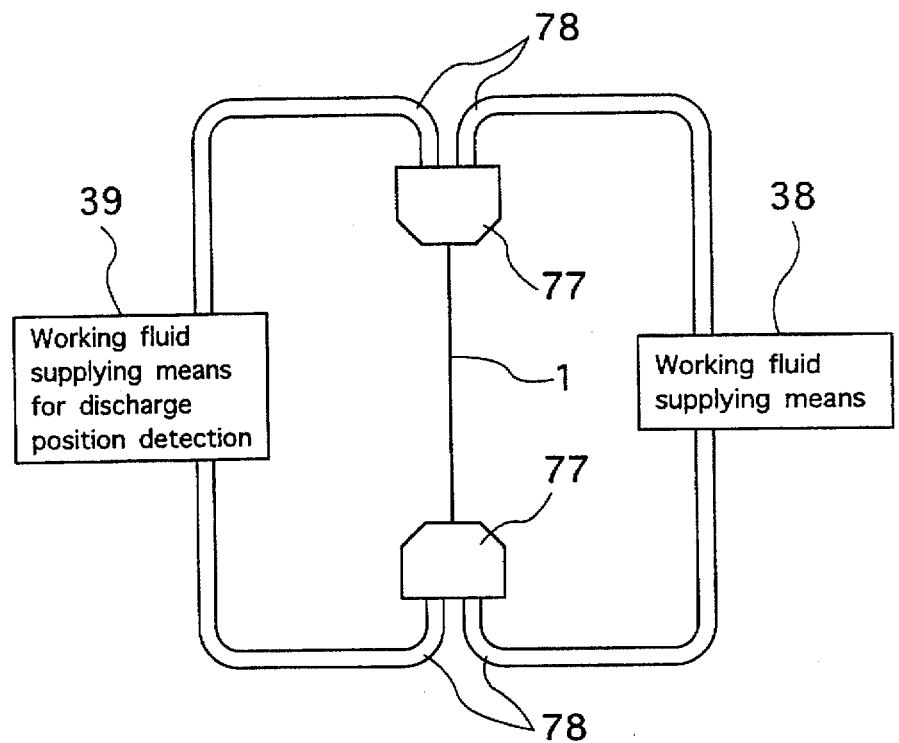
FIG. 13 is an explanatory drawing showing two working fluid supplying means in a wire electrode discharge machine according to a seventh embodiment of the present invention.

FIG. 13 is an explanatory drawing which shows two working fluid supplying means in a wire electrode discharge machine according to a seventh embodiment of the present invention. The overall structure of the wire electrode discharge machine is same as that of FIG. 1, therefore a further detailed description thereof is omitted, and FIG. 1 may be referred to if required.

In FIG. 13, reference numeral 1 is a wire electrode, 38 is working fluid supplying means, 39 is working fluid supplying means for discharge position detection, 77 is a working fluid nozzle, and 78 is a working fluid providing supplying pipe.

Figure 14:
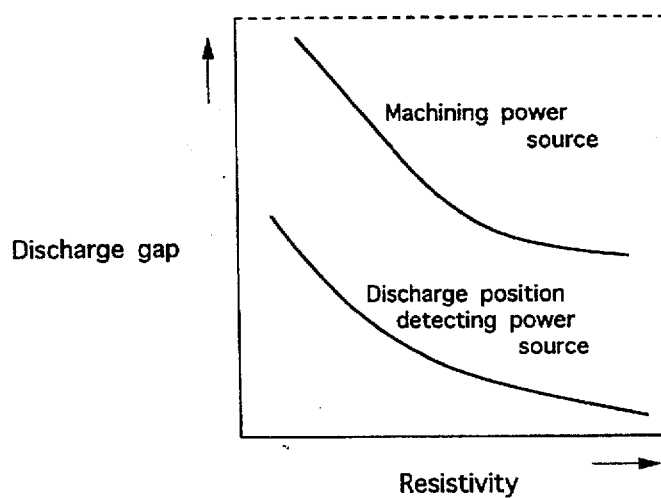
FIG. 14 is a graph showing a relation between a discharge distance from a wire electrode to a workpiece and the resistivity of the working fluid, while using, as parameters, a machining power source and the discharge position detecting power source in the wire electrode discharge machine according to the seventh embodiment of the present invention.

FIG. 14 is a graph showing the relation between the discharge gap and the resistivity of the working fluid, wherein the discharge gap means the distance at which the discharge is generated between the wire electrode 1 and the workpiece 14 while using the machining power source 26 and the discharge position detecting power source 27 as parameters. As obviously seen from the graph, the discharge gap becomes smaller if the resistivity becomes high in both the power sources 26 and 27. When switching the power source from the machining power source 26 for wire electrode discharge machining to the discharge position detecting power source 27 for checking the verticality to the workpiece, the discharge gap becomes smaller. Comparing the machining power source 26 with the discharge position detecting power source 27, the discharge gap is smaller in case of using the discharge position detecting power source 27 than using the machining power source 26.

The working fluid supplying means 38 and the working fluid supplying means for discharge position detection are independently provided. The resistivity of the working fluid in each of the working fluid supplying means 38 and 39 can be freely controlled respectively. Usually, the working fluid supplying means 39 for discharge position detection contains therein a working fluid of a higher resistivity than the working fluid supplying means 38. The higher the resistivity of the working fluid is, the smaller the discharge gap becomes, so that a form transfer accuracy increases, and the precision of the products becomes better. However, it is expensive to keep a high resistivity. On the other hand, the lower the resistivity of the working fluid is, the larger the discharge distance becomes, so that the form transfer accuracy decreases and the precision of the products becomes worse. However, the maintenance cost is inexpensive, since it is unnecessary to keep the resistivity high. The machining accuracy and the cost are inversely proportional in case of the working fluid of high resistivity and the working fluid of low resistivity. However, it is possible to select and use the adequate one according to the situation, so that the discharge position detection and machining can be carried out in the best condition in accordance with the situation. An NC means 25 controls the switching operation of the working fluid supplying means 38 and the working fluid supplying means 39 for discharge position detection. Here, it is possible to provide only one working fluid supplying means and use it while keeping the resistivity high only in case of checking the verticality to the workpiece.

As mentioned above, in addition to the structure in the above mentioned first or second embodiment, the wire electrode discharge machine of the present embodiment can further comprise: working fluid supplying means 39 for discharge position detection for supplying a working fluid for discharge position detection between the wire electrode 1 and the workpiece 14 in detecting the discharge position by the discharge position detecting means 21.

Accordingly, since the working fluid for discharge position detection is supplied between the wire electrode 1 and the workpiece 14 in detecting the discharge position, it is possible to make discharge stable and control discharge gap properly at discharge position detecting time. Moreover, it is possible to perform a verticality check by discharge with high accuracy.

Eighth Embodiment

Figure 15A:
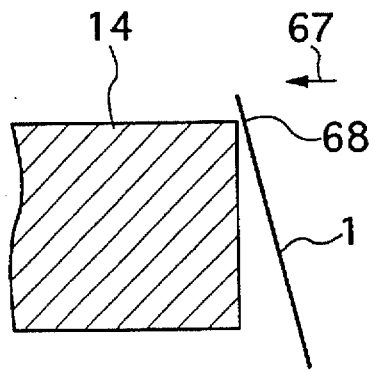
FIGS. 15a, 15b and 15c are explanatory drawings showing a method for correcting the slant of a wire electrode to a workpiece with an approach machining in a wire electrode discharge machine according to an eighth embodiment of the present invention.
Figure 15B:
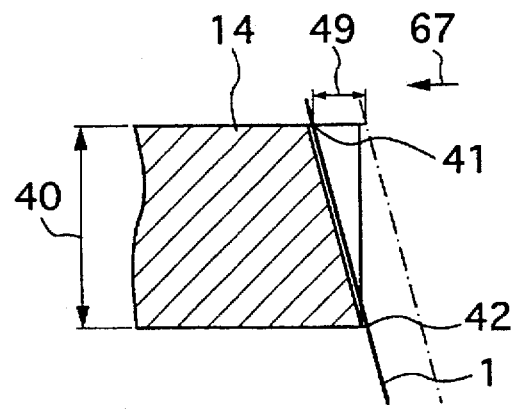

FIGS. 15a and 15b are explanatory drawings which show a way of correcting slant of the wire electrode 1 relative to the workpiece utilizing approach machining in the wire electrode discharge machine according to an eighth embodiment of the present invention. Approach machining means temporary machining from the machining start point to a position to be a contour or outline of a final product. The overall structure of the wire electrode discharge machine is same as that of FIG. 1, therefore a further detailed description thereof is omitted, and FIG. 1 may be referred to if required.

Figure 15C:
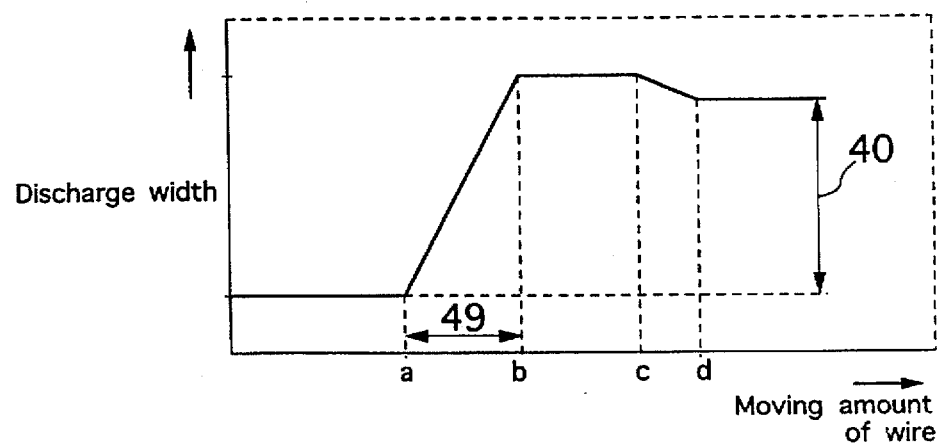

In FIGS. 15a and 15b, reference numeral 1 is a wire electrode, 14 is a workpiece, 40 is the thickness of the workpiece 14, 41 is a discharge upper end, 42 is a discharge lower end, 49 is a correcting value, 62 is a discharge point. An arrow 67 shows a wire electrode machining direction. In FIG. 15a, the slanted wire electrode 1 approaches the workpiece 14 in the direction of the arrow 67, and the first discharge is generated at the discharge point 68. In FIG. 15b, the wire electrode 1 further advances in the direction of the arrow 67, and both the discharge upper end 41 and the discharge lower end 42 become level with the top end and bottom end of the workpiece 14, respectively. FIG. 15c is a graph which shows a relation between a moving amount of the wire electrode 1 and a discharge width. The axis of abscissa indicates the moving amount of the electrode 1 in the X-axis or Y-axis direction, and the axis of ordinate indicates the calculated discharge width. The point "a" on the abscissa corresponds to the state of FIG. 15a, the point "b" corresponds to the state of FIG. 15b, the point "c" shows a state after a predetermined time period from the time when the discharge width becomes constant, and the point "d" shows a state in which the correction has been finished.

Referring to FIG. 15c, the operation is described hereunder.

The discharge width is zero until the wire electrode 1 shifted in the direction of the arrow 67 generates the first discharge at the point "a". The discharge width continues to increase until both the discharge upper end 41 and the discharge lower end 42 become level with the top end and bottom end of the workpiece 14, respectively. The wire electrode 1 advances further in the direction of the arrow 67, and the discharge width becomes constant from the point "b" to the point "c". At the point "c", which shows the state when the predetermined time period has lapsed after the discharge width has become constant, the moving amount of the electrode 1 in the X-axis or Y-axis direction which was necessary for changing the discharge width from the point "a" to the point "b" is recalled. This moving amount is recognized as a correcting amount, and the upper wire electrode guide 3 is moved in the U-axis or V-axis direction by this correcting amount so as to correct the slant. At the point "d", the correction is completed and the discharge width coincides with the thickness 40 of the workpiece 14.

Figure 16:
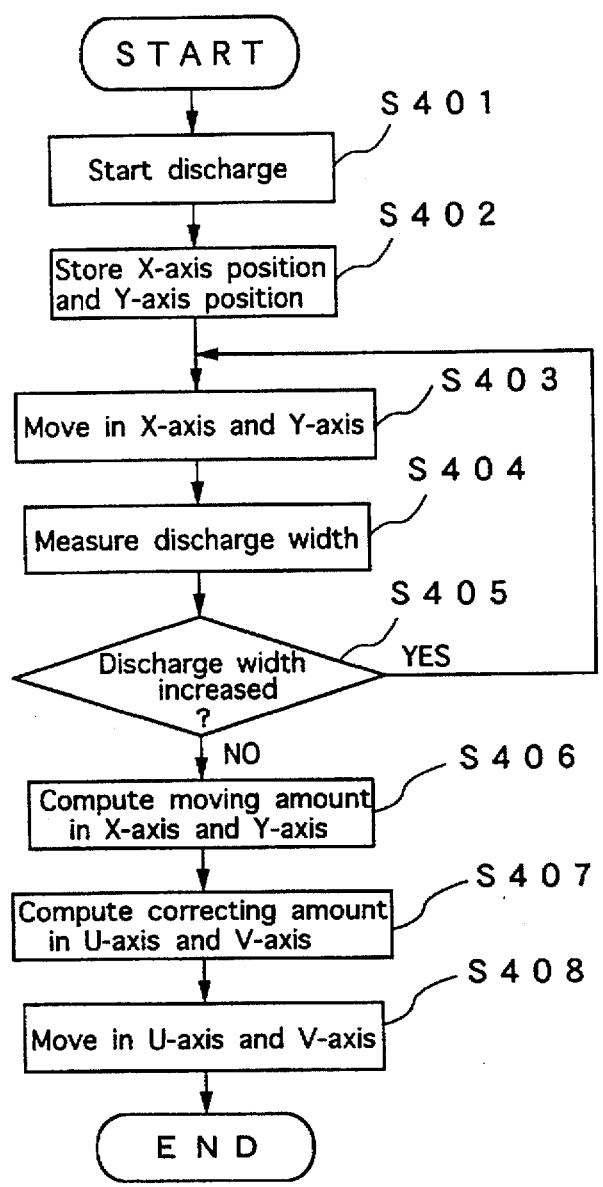
FIG. 16 is a flow chart showing a procedure by an NC machine of the wire electrode discharge machine according to the eighth embodiment of the present invention.

An operation in the NC means 25 of the wire electrode discharge machine of the present embodiment is described on the basis of FIG. 16, while referring to the above mentioned FIGS. 15a, 15b and 15c.

First, in Step S401, the X-axis motor 5 and the Y-axis motor 6 are rotated to shift the table 2 until the first discharge is generated, thereby detecting the discharge start position (refer to FIG. 15a, namely, the point "a" in the moving amount of the electrode 1 shown in FIG. 15c). The procedure proceeds to Step S402, and the X-axis and Y-axis position of the electrode in the state of Step S401 is stored. In next Step S403, the table 2 is shifted by a prescribed amount in the X-axis and Y-axis direction. In next Step S404, the discharge width is measured. In next Step S405, it is decided whether the discharge width increases or not. If the decision is "Yes", the process from Step S403 to Step S405 is repeated.

If the decision of Step S405 is "No" (the point "b" in the moving amount of the electrode shown in FIG. 15c), the procedure proceeds to Step S 406. Then, the moving amount of the electrode in X-axis and Y-axis (equivalent to the correcting value 49 shown in FIG. 15b and FIG. 15c) is calculated on the basis of the present electrode position in the X-axis and Y-axis and the electrode position in the X-axis and Y-axis stored in Step S402. In next Step S407, the correcting amount of the electrode in the U-axis and V-axis is calculated based on the discharge width measured in Step S404 and the correcting value 49. In next Step S408, the upper wire electrode guide 3 is moved (from the point "c" to the point "d" in the moving amount of the electrode shown in FIG. 15c) in the U-axis and V-axis direction by rotating the U-axis motor 7 and V-axis motor 8, based on the correcting amount of the electrode in the U-axis and V-axis calculated in Step S407. Then, this routine is ended.

As mentioned above, the wire electrode discharge machine of this embodiment comprises: working fluid supplying means 38 for supplying working fluid between a wire electrode 1 and a workpiece 14; a machining power source 26 for applying a voltage to generate a discharge between the wire electrode 1 and the workpiece 14 through the working fluid supplied from the working fluid supplying means 38; a table 2 capable of fixing the workpiece 14; table control means 9 for controlling movement of the table 2 in X-axis and Y-axis directions; a pair of wire electrode guides 3, 4 respectively located at the top and bottom of the workpiece 14; taper control means 10 for controlling the slant of the wire electrode 1 relative to the workpiece 14 by moving one of the wire electrode guides 3, 4 in U-axis and V-axis directions; the discharge position detecting means 21 for detecting the discharge position between the wire electrode 1 and the workpiece 14 based on the current supplied through an upper power supplying line 17 and a lower power supplying line 18 from the machining power source 26 to the wire electrode 1; a discharge width computing means 29 for calculating a discharge width based on the amount the discharge position shifts in the X-axis and Y-axis directions detected by the discharge position detecting means 21 at fixed time intervals; a discharge width storage means, constituted by an NC means 25, for storing the discharge width calculated by the discharge width computing means 29; an amount of variation computing means, constituted by the NC means 25, for calculating an amount of variation of the discharge width calculated by the discharge width computing means; and a wire electrode slant computing means 28 for calculating the slant of the wire electrode 1 based on the shifting amount of the discharge position in the X-axis and Y-axis directions detected by the discharge position detecting means 21 until the amount of variation becomes zero after a first discharge is generated. Moreover, the invention encompasses the method by which this machine operates.

Accordingly, voltage is applied, by the machining power source 26, to generate a discharge through working fluid supplied between the wire electrode 1 and the workpiece 14 from the working fluid supplying means 38. The movement, in the X-axis direction and the Y-axis direction, of the table 2 on which the workpiece 1 is fixed is controlled by the table control means 25. The slant of the wire electrode 1 relative to the workpiece 14 is controlled by the taper control means 10 by moving, in the U-axis direction and the V-axis direction, one of a pair of wire electrode guides 3, 4 respectively located at the top and the bottom of the workpiece 14. The discharge position between the wire electrode 1 and the workpiece 14 is detected by the discharge position detecting means 21 based on the current supplied from the machining power source to the wire electrode. A discharge width is calculated based on the amount the discharge position shifts in the X-axis and Y-axis directions at fixed time intervals, in the discharge width computing means 29. The discharge width is stored in the NC means 25 as the discharge width storage means. The amount of variation of the discharge width is calculated by the NC means 25 as the amount of variation computing means. The slant of the wire electrode 1 is calculated based on the shifting amount of the discharge position, in the X-axis and Y-axis directions, detected until the amount of variation becomes zero after a first discharge is generated, in the wire electrode slant computing means 28.

As a result, it is possible to correct the slant of the wire electrode 1 relative to the workpiece 14 (one axis correction) automatically without specifying the thickness 40 of the workpiece 14. Accordingly, a verticality check of the wire electrode 1 by discharge before machining is unnecessary and the time necessary for setup arrangements can be reduced drastically.

The wire electrode discharge machine of this embodiment comprises: working fluid supplying means 38 for supplying working fluid between a wire electrode 1 and a workpiece 14; a machining power source 26 for applying a voltage to generate a discharge between the wire electrode 1 and the workpiece 14 through the working fluid supplied from the working fluid supplying means 38; a table 2 capable of fixing the workpiece 14; table control means 9 for controlling movement of the table 2 in X-axis and Y-axis directions; a pair of wire electrode guides 3, 4 respectively located at the top and bottom of the workpiece 14; taper control means 10 for controlling the slant of the wire electrode 1 relative to the workpiece 14 by moving one of the wire electrode guides 3, 4 in U-axis and V-axis directions; the discharge position detecting means 21 for detecting the discharge position between the wire electrode 1 and the workpiece 14 based on the current supplied through an upper power supplying line 17 and a lower power supplying line 18 from the machining power source 26 to the wire electrode 1; and a correcting amount computing means, constituted by an NC means 25, for calculating a correcting amount for correcting the slant of the wire electrode 1 relative to the workpiece 14 based on a shift of the discharge position, while performing approach machining, which is a shape machining for the workpiece 14, until the wire electrode 1 reaches a product contour. Moreover, it can be an embodiment of the wire electrode discharge method by changing each means of the wire electrode discharge machine in the present embodiment into a step.

Accordingly, voltage is applied, by the machining power source 26, to generate a discharge through working fluid supplied between the wire electrode 1 and the workpiece 14 from the working fluid supplying means 38. The movement, in the X-axis direction and the Y-axis direction, of the table 2 on which the workpiece 1 is fixed is controlled by the table control means 25. The slant of the wire electrode 1 relative to the workpiece 14 is controlled by the taper control means 10 by moving, in the U-axis direction and the V-axis direction, one of a pair of wire electrode guides 3, 4 respectively located at the top and the bottom of the workpiece 14. The discharge position between the wire electrode 1 and the workpiece 14 is detected by the discharge position detecting means 21 based on the current supplied from the machining power source to the wire electrode. A correcting amount for correcting the slant of the wire electrode 1 relative to the workpiece 14 is calculated based on a shift of the discharge position, while performing approach machining, which is a shape machining for the workpiece 14, until the wire electrode 1 reaches a product contour, in the NC means as the correcting amount computing means.

Therefore, it is possible to correct the slant of the wire electrode 1 relative to the workpiece 14 (one axis correction) automatically without specifying the thickness 40 of the workpiece 14. Accordingly, verticality check of the wire electrode 1 by discharge before machining is unnecessary and time necessary for arrangements can be reduced drastically.

Ninth Embodiment

FIGS. 17a and 17b are explanatory drawings which show a method for correcting slant of a wire electrode 1 relative to a workpiece while machining the workpiece in the wire electrode discharge machine according to a ninth embodiment of the present invention. The overall structure of the wire electrode discharge machine is same as that of FIG. 1, therefore a further detailed description thereof is omitted, and FIG. 1 may be referred to if required.

In FIGS. 17a and 17b, 1 is the wire electrode, and 14 is a workpiece. In FIG. 17a, the wire electrode 1 is slanted relative to the discharge machining surface of the workpiece 14. In FIG. 17b, the wire electrode 1 is parallel with the discharge machining surface of the workpiece 14. FIG. 17c is a graph which shows the relation between slant angle and discharge width. The abscissa indicates the slant angle, and the ordinate indicates the discharge width.

Next, the operation is explained with reference to FIG. 17c.

As shown in the graph of FIG. 17c, regarding the relation between the slant angle of the wire electrode 1 relative to the workpiece and the discharge width, the discharge width becomes the narrowest at the slant angle of zero degree. Moreover, the bigger the slant angle becomes, the wider the discharge width is. Using this fact, a prescribed amount of slant is given to the wire electrode 1 in the positive or negative direction of the U-axis and the V-axis in turn during electric discharge machining, so that the angle where the discharge width becomes smallest is found. It is recognized that the wire electrode 1 is parallel with the electric discharge machining surface of the workpiece 14 at this angle. Then, the wire electrode 1 is slanted in that angle, and the correction is finished. In this operation, the accuracy of detecting the discharge position is about one micrometer when the thickness 40 of the workpiece 14 is 40 millimeters.

Figure 18:
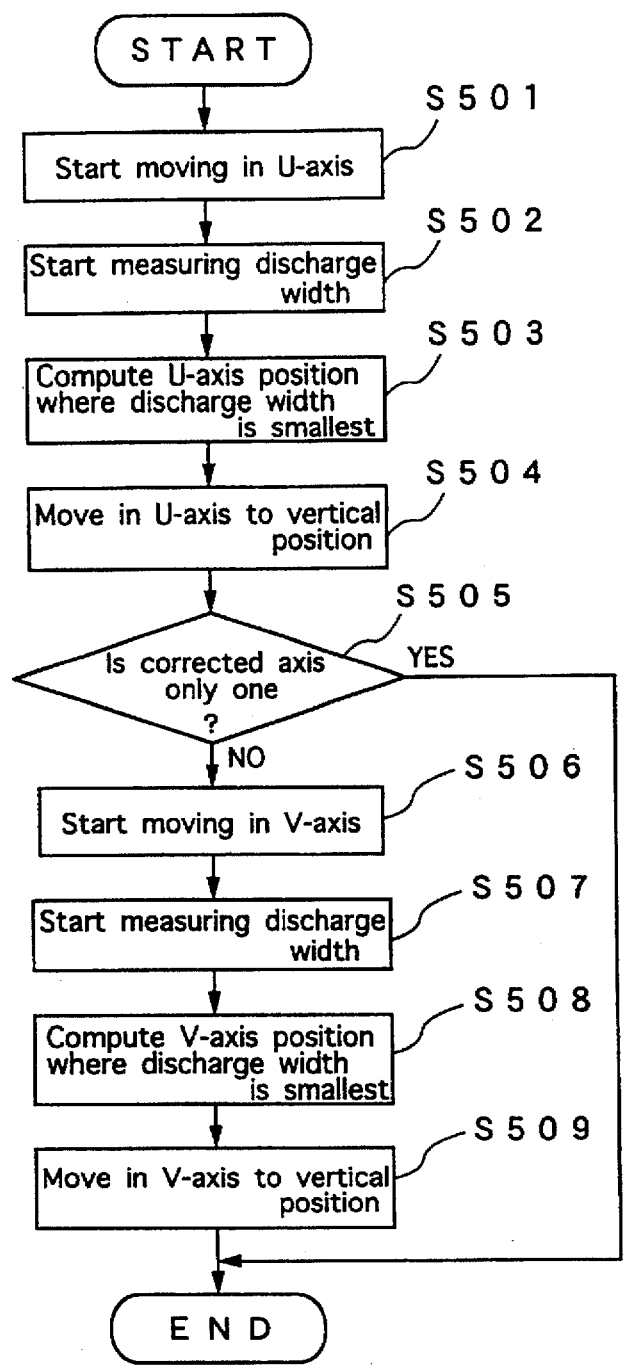
FIG. 18 is a flow chart showing a procedure by an NC machine of the wire electrode discharge machine according to the ninth embodiment of the present invention.
Figure 19:
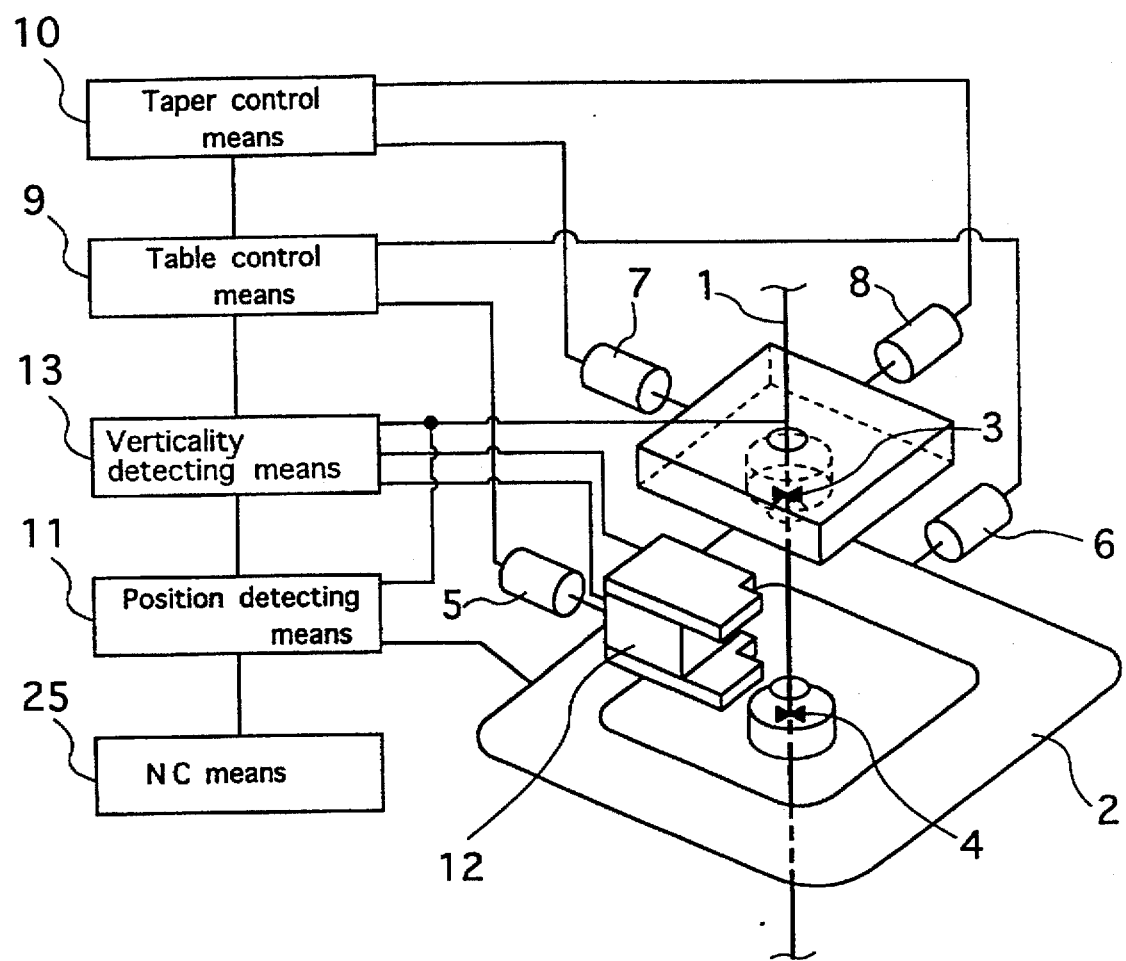
FIG. 19 is a diagrammatic illustration showing a conventional wire electrode discharge machine.
Figure 20A:
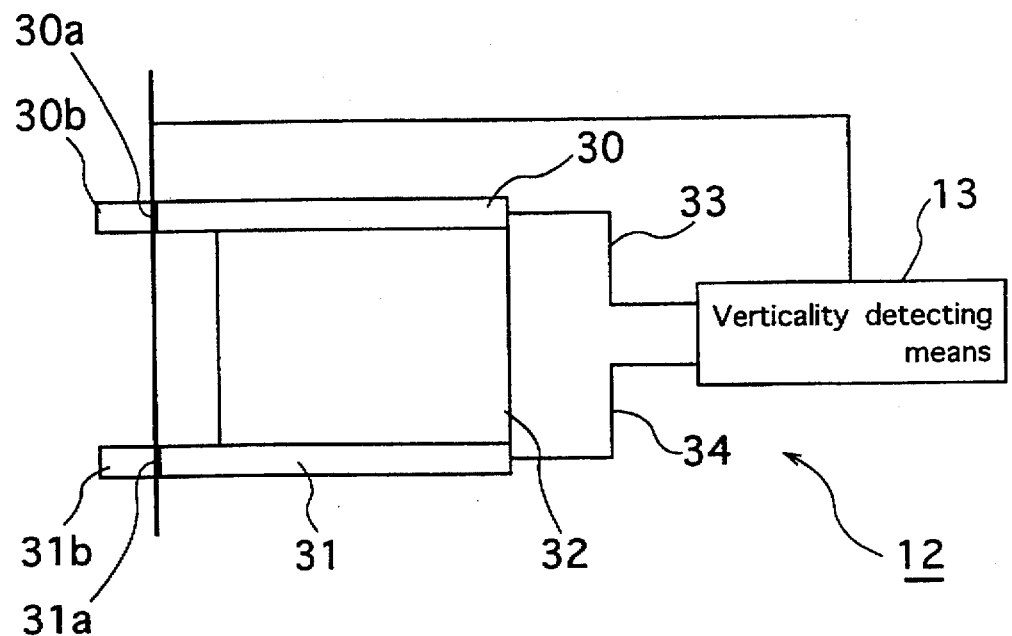
FIG. 20 is a structural detail drawing showing a rectangular jig of FIG. 19.
Figure 20B:
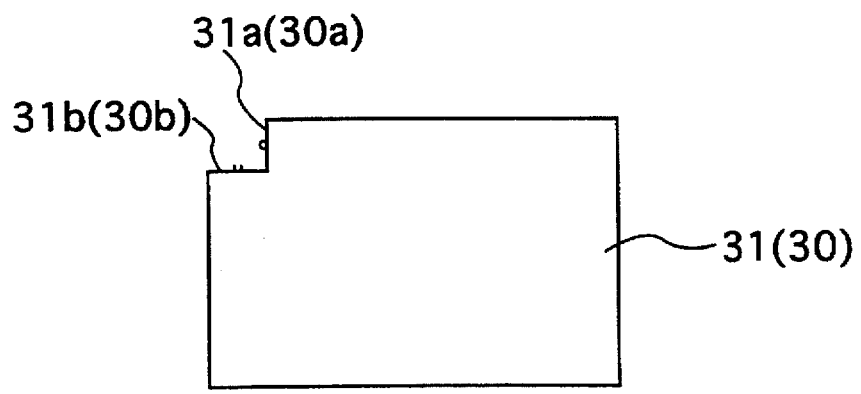

The operation of the NC means 25 of the wire electrode discharge machine of the present embodiment is described on the basis of FIG. 18, while referring to the above mentioned FIGS. 17a, 17b and 17c.

First, in Step S501, the U-axis motor 7 is rotated to move the electrode 1 in the U-axis direction, thereby start moving upper wire electrode guide 3. In next Step S502, measuring of the discharge width is started. In next Step S503, a position of the electrode 1 in the U-axis where the discharge width measured in Step S502 becomes minimum (the position of the slant angle zero shown in FIG. 17c) is calculated. The procedure proceeds to next Step S504, the electrode 1 is moved in the U-axis to the vertical position where the discharge width calculated in Step S503 becomes minimum in the U-axis direction, by rotating the U-axis motor 7. In next Step S505, it is decided whether the number of an axis to be corrected is only one or not. If the decision in Step S505 is "Yes" and there is no other axis to be corrected, this routine is ended.

On the other hand, if the decision in Step S505 is "No", the procedure proceeds to Step S506 and the upper wire electrode guide 3 is started moving in the V-axis direction by rotating the V-axis motor 8. In next Step S507, measuring of the discharge width is started. In next Step S508, the position of the electrode 1 in the V-axis where the discharge width measured in Step S507 becomes minimum (the position of the slant angle zero shown in FIG. 17c) is calculated. In next Step S509, the electrode is moved in the V-axis to the vertical position where the discharge width calculated in Step S508 becomes minimum in the V-axis direction, by rotating the V-axis motor 8. Then, this routine is ended.

As mentioned above, the wire electrode discharge machine of this embodiment comprises: working fluid supplying means 38 for supplying working fluid between a wire electrode 1 and a workpiece 14; a machining power source 26 for applying a voltage to generate a discharge between the wire electrode 1 and the workpiece 14 through the working fluid supplied from the working fluid supplying means 38; a table 2 capable of fixing the workpiece 14; table control means 9 for controlling movement of the table 2 in X-axis and Y-axis directions; a pair of wire electrode guides 3, 4 respectively located at the top and bottom of the work-piece 14; taper control means 10 for controlling the slant of the wire electrode 1 relative to the workpiece 14 by moving one of the wire electrode guides 3, 4 in U-axis and V-axis directions; the discharge position detecting means 21 for detecting the discharge position between the wire electrode 1 and the workpiece 14 based on the current supplied through an upper power supplying line 17 and a lower power supplying line 18 from the machining power source 26 to the wire electrode 1; a discharge width computing means 29 for moving the wire electrode guide 3 in the U-axis and V-axis directions while carrying out machining for contouring the workpiece 14 by moving the table 2 in the X-axis and Y-axis directions, and calculating the amount of variation of the discharge width based on the amount the discharge position shifts in the U-axis and V-axis directions detected by the discharge position detecting means 21 at fixed time intervals; and a wire electrode slant computing means 28 for calculating the slant of the wire electrode 1 where the amount of variation of the discharge width calculated by the discharge width computing means 29 is minimum. Moreover, the invention encompasses the method by which this machine operates Accordingly, voltage is applied, by the machining power source 26, to generate a discharge through working fluid supplied between the wire electrode 1 and the workpiece 14 from the working fluid supplying means 38. The movement, in the X-axis direction and the Y-axis direction, of the table 2 on which the workpiece 1 is fixed is controlled by the table control means 25. The slant of the wire electrode 1 relative to the workpiece 14 is controlled by the taper control means 10 by moving, in the U-axis direction and the V-axis direction, one of a pair of wire electrode guides 3, 4 respectively located at the top and the bottom of the workpiece 14. The discharge position between the wire electrode 1 and the workpiece 14 is detected by the discharge position detecting means 21 based on the current supplied from the machining power source to the wire electrode. The wire electrode guide 3 is moved in the U-axis and V-axis directions while machining is carried out for contouring the workpiece 14 by moving the table 2 in the X-axis and Y-axis directions. The amount of variation of the discharge width is calculated based on the amount the discharge position shifts in the U-axis and V-axis directions at fixed time intervals, in the discharge width computing means 29. The slant of the wire electrode 1, where the amount of variation of the discharge width is minimum, is calculated, in the wire electrode slant computing means 28.

Therefore, it is possible to check automatically the verticality of the wire electrode 1 by discharge properly as a slant correction of the wire electrode 1 relative to the workpiece 14 (two axes correction) during machining, without specifying the thickness 40 of the workpiece 14. Accordingly, the time necessary for arrangements before machining can be reduced drastically.

As described above, according to the wire electrical discharge machine and method of the first and second aspects of the invention, a voltage is applied, by a machining power source, to generate a discharge through working fluid supplied between a wire electrode and a workpiece. The movement, in the X-axis direction and the Y-axis direction, of a table on which the workpiece is fixed is controlled. The slant of the wire electrode relative to the workpiece is controlled by moving, in a U-axis direction and a V-axis direction, one of a pair of wire electrode guides respectively located at the top and bottom of the workpiece. The discharge position between the wire electrode and the workpiece is detected based on the current supplied from the machining power source to the wire electrode. The slant direction of the wire electrode relative to the workpiece is decided based on a shift of the discharge position detected at the time of approaching the wire electrode to the workpiece. The slant of the wire electrode relative to the workpiece is corrected based on the slant direction of the wire electrode. Therefore, it is possible to correct the slant of the wire electrode relative to the workpiece directly by using the wire electrode. Accordingly, it is possible to drastically reduce the time necessary for accurately fixing the workpiece on the table as well as the time necessary for arrangements such as the verticality check of the wire electrode by discharge.

According to the wire electrical discharge machine and method of the third and fourth aspects of the invention, voltage is applied, by a machining power source, to generate a discharge through working fluid supplied between a wire electrode and a workpiece. The movement, in the X-axis direction and the Y-axis direction, of a table on which the workpiece is fixed is controlled. The slant of the wire electrode relative to the workpiece is controlled by moving, in a U-axis direction and a V-axis direction, one of a pair of wire electrode guides respectively located at the top and bottom of the workpiece. The discharge position between the wire electrode and the workpiece is detected based on the current supplied from the machining power source to the wire electrode. The discharge position is measured for a prescribed time period while approaching the wire electrode to the workpiece. The distance between the upper end and the lower end of the discharge position is calculated as a discharge width in the thickness direction of the workpiece. A correcting amount for correcting the slant of the wire electrode relative to the workpiece is calculated based on the discharge width, the thickness of the workpiece and the discharge position. Therefore, it is possible to correct the slant of the wire electrode relative to the workpiece directly by using the wire electrode and to correct the slant of the wire electrode relative to the workpiece quickly. Accordingly, it is possible to drastically reduce the time necessary for getting accuracy in fixing the workpiece on the table and the time necessary for arrangements such as the verticality check of the wire electrode by discharge.

According to the wire electrical discharge machine and method of the fifth and sixth aspects of the invention, a voltage is applied, by a machining power source, to generate a discharge through working fluid supplied between a wire electrode and a workpiece. The movement, in the X-axis direction and the Y-axis direction, of a table on which the workpiece is fixed is controlled. The slant of the wire electrode relative to the workpiece is controlled by moving, in a U-axis direction and a V-axis direction, one of a pair of wire electrode guides respectively located at the top and bottom of the workpiece. The discharge position between the wire electrode and the workpiece is detected based on the current supplied from the machining power source to the wire electrode. The discharge position is measured for a prescribed time period while approaching the wire electrode relative to the workpiece. The thickness of the workpiece is equally divided into a number specified in a predetermined program and a number of times of discharge is counted at each of divided parts of the workpiece. A correcting amount for correcting the slant of the wire electrode relative to the workpiece is calculated based on the number of times of discharge, the thickness of the workpiece and the discharge position. Therefore, it is possible to correct the slant of the wire electrode relative to the workpiece directly by using the wire electrode and to correct the slant of the wire electrode relative to the workpiece quickly. Accordingly, it is possible to drastically reduce the time necessary for getting accuracy in fixing the workpiece on the table and the time necessary for arrangements such as the verticality check of the wire electrode by discharge.

According to the wire electrical discharge machine and method of the seventh and eighth aspects of the invention, moreover, the discharge position, which is detected by the discharge generated between the wire electrode and the workpiece by moving the wire electrode guide in the U-axis and V-axis directions to slant the wire electrode, is stored. Then, the workpiece thickness is calculated from the discharge position. Thus, the workpiece thickness is calculated automatically. Therefore, the verticality check of the wire electrode, which was conventionally operated after measuring correctly the workpiece thickness and specifying it, can be carried out in a series of operations, so that it is possible to improve accuracy. In addition, the slant of the wire electrode 1 relative to the workpiece 14 can be corrected at the same time with detecting the discharge position, so that it is possible to reduce time.

According to the wire electrical discharge machine of the ninth aspect of the invention, moreover, since the discharge position detecting power source is provided for a contour machining, for supplying power for a lesser amount of machining per unit time compared to the machining power source, it is possible to check the verticality of the wire electrode by discharge with little damage to the machining surface. In addition, one of two machining power sources can be selected optionally, so that it is possible to select them freely to check the verticality by discharge while machining contour. Moreover, it is possible to correct the slant of the wire electrode relative to the workpiece according to conditions, thereby performing a machining with high accuracy and high quality.

According to the wire electrical discharge machine of claim 10, in addition to the effects of one of claim 1, claim 3 or claim 5, moreover, since the working fluid for discharge position detection is supplied between the wire electrode and the workpiece in detecting the discharge position, it is possible to make discharge stable and control discharge gap properly at discharge position detecting time. Moreover, it is possible to perform a verticality check by discharge with high accuracy.

According to the wire electrical discharge machine and method of the eleventh and twelfth aspects of the invention, the irregular discharge detected due to the concentrated discharge is excluded from the correcting amount. Therefore, it is possible to detect the discharge position with higher accuracy by excluding the irregular discharge due to the concentrated discharge.

According to the wire electrical discharge machine and method of the thirteenth and fourteenth aspects of the invention, a voltage is applied, by a machining power source, to generate a discharge through working fluid supplied between a wire electrode and a workpiece. The movement, in the X-axis direction and the Y-axis direction, of a table on which the workpiece is fixed is controlled. The slant of the wire electrode relative to the workpiece is controlled by moving, in a U-axis direction and a V-axis direction, one of a pair of wire electrode guides respectively located at the top and bottom of the workpiece. The discharge position between the wire electrode and the workpiece is detected based on the current supplied from the machining power source to the wire electrode. The slant of the wire electrode relative to each of a plurality of the workpieces is calculated based on the discharge position. A correcting amount for correcting the slant of the wire electrode relative to the workpiece is calculated based on the slant of the wire electrode. Machining of the workpiece is continued by recalling one of the stored correcting amounts corresponding relative to the workpiece to be machined while executing a prescribed program. Therefore, it is not necessary to employ a high degree of accuracy in fixing the workpiece on the table. Accordingly, even if there are a plurality of workpieces, it is possible to automate all processes from the verticality check of the wire electrode to the contour machining, only by fixing the workpieces on the table. Therefore, it is possible to obtain a prolonged unmanned operation period.

According to the wire electrical discharge machine and method of the fifteenth and sixteenth aspects of the invention, a voltage is applied, by a machining power source, to generate a discharge through working fluid supplied between a wire electrode and a workpiece. The movement, in the X-axis direction and the Y-axis direction, of a table on which the workpiece is fixed is controlled. The slant of the wire electrode relative to the workpiece is controlled by moving, in a U-axis direction and a V-axis direction, one of a pair of wire electrode guides respectively located at the top and bottom of the workpiece. The discharge position between the wire electrode and the workpiece is detected based on the current supplied from the machining power source to the wire electrode. A discharge width is calculated based on the amount the discharge position shifts in the X-axis and Y-axis directions at fixed time intervals. The discharge width is stored. The amount of variation of the discharge width is calculated. The slant of the wire electrode is calculated based on the shifting amount of the discharge position, in the X-axis and Y-axis directions, detected until the amount of variation becomes zero after a first discharge is generated. Therefore, it is possible to correct the slant of the wire electrode relative to the workpiece automatically without specifying the workpiece thickness. Accordingly, verticality check of the wire electrode by discharge before machining is unnecessary and time necessary for arrangements can be reduced drastically.

According to the wire electrical discharge machine and method of the seventeenth and eighteenth aspects of the invention, a voltage is applied, by a machining power source, to generate a discharge through working fluid supplied between a wire electrode and a workpiece. The movement, in the X-axis direction and the Y-axis direction, of a table on which the workpiece is fixed is controlled. The slant of the wire electrode relative to the workpiece is controlled by moving, in a U-axis direction and a V-axis direction, one of a pair of wire electrode guides respectively located at the top and bottom of the workpiece. The discharge position between the wire electrode and the workpiece is detected based on the current supplied from the machining power source to the wire electrode. The wire electrode guide is moved in the U-axis and V-axis directions while a machining is carried out for contour of the workpiece by moving the table in the X-axis and Y-axis directions. The amount of variation of the discharge width is calculated based on the amount the discharge position shifts in the U-axis and V-axis directions at fixed time intervals. The slant of the wire electrode, where the amount of variation of the discharge width is minimum, is calculated. Therefore, it is possible to check the verticality of the wire electrode by discharge properly in the machining workpiece without specifying the workpiece thickness. Accordingly, the time necessary for preparatory arrangements before machining can be reduced drastically.

According to the wire electrical discharge machine and method of the nineteenth and twentieth aspects of the invention, a voltage is applied, by a machining power source, to generate a discharge through working fluid supplied between a wire electrode and a workpiece. The movement, in the X-axis direction and the Y-axis direction, of a table on which the workpiece is fixed is controlled. The slant of the wire electrode relative to the workpiece is controlled by moving, in a U-axis direction and a V-axis direction, one of a pair of wire electrode guides respectively located at the top and bottom of the workpiece. The discharge position between the wire electrode and the workpiece is detected based on the current supplied from the machining power source to the wire electrode. A correcting amount for correcting the slant of the wire electrode relative to the workpiece is calculated based on a shift of the discharge position, while performing approach machining, which is a shape machining for the workpiece, until the wire electrode reaches a product contour. Therefore, it is possible to correct the slant of the wire electrode relative to the workpiece automatically while performing the approach machining without specifying the workpiece thickness. Accordingly, a verticality check of the wire electrode by discharge before machining is unnecessary and time necessary for arrangements can be reduced drastically.

What is claimed is:

1. A wire electrode discharge machine, comprising:
   working fluid supplying means for supplying working fluid between a wire electrode and a workpiece;
   a machining power source for applying a voltage to generate a discharge between said wire electrode and said workpiece through said working fluid supplied from said working fluid supplying means;
   a table on which said workpiece is fixed;
   table control means for controlling a movement of said table in X-axis and Y-axis directions;
   a pair of wire electrode guides respectively located at a top and a bottom of said workpiece;
   taper control means for controlling a slant of said wire electrode relative to said workpiece by moving one of said wire electrode guides in U-axis and V-axis directions;
   discharge position detecting means for detecting the discharge position between said wire electrode and said workpiece based on a current supplied through an upper power supplying line and a lower power supplying line from said machining power source to said wire electrode;
   wire electrode slant determining means for determining a slant direction of said wire electrode relative to said workpiece based on a shift of said discharge position detected by said discharge position detecting means while approaching said wire electrode relative to said workpiece; and
   a wire electrode slant correcting means for correcting the slant of said wire electrode relative to said workpiece based on the slant direction of said wire electrode determined by said wire electrode slant determining means.

2. A wire electrode discharge machine as claimed in claim 1, further comprising:
   an irregular discharge detecting means for detecting a concentrated discharge as an irregular discharge if the concentrated discharge is generated in detecting the discharge position by said discharge position detecting means; and
   a correcting amount excluding means for excluding the irregular discharge from a correcting amount calculated by a correction amount computing means when the irregular discharge is detected by said irregular discharge detecting means.

3. A wire electrode discharge machine, comprising:
   working fluid supplying means for supplying working fluid between a wire electrode and a workpiece;
   a machining power source for applying a voltage to generate a discharge between said wire electrode and said workpiece through said working fluid supplied from said working fluid supplying means;
   a table on which said workpiece is fixed;
   table control means for controlling a movement of said table in X-axis and Y-axis directions;

a pair of wire electrode guides respectively located at a top and a bottom of said workpiece;

taper control means for controlling a slant of said wire electrode relative to said workpiece by moving one of said wire electrode guides in U-axis and V-axis directions;

discharge position detecting means for detecting the discharge position between said wire electrode and said workpiece based on a current supplied through an upper power supplying line and a lower power supplying line from said machining power source to said wire electrode;

means for measuring said discharge position, for a prescribed time period, detected by said discharge position detecting means while moving said wire electrode toward said workpiece;

discharge width computing means for calculating a distance between an upper end and a lower end of said discharge position as a discharge width in a thickness direction of said workpiece; and correcting amount computing means for calculating a correcting amount for correcting the slant of said wire electrode relative to said workpiece based on said discharge width calculated by said discharge width computing means, a thickness of said workpiece and said discharge position detected by said discharge position detecting means.

4. A wire electrode discharge machine, comprising:

working fluid supplying means for supplying working fluid between a wire electrode and a workpiece;

a machining power source for applying a voltage to generate a discharge between said wire electrode and said workpiece through said working fluid supplied from said working fluid supplying means;

a table on which said workpiece is fixed;

table control means for controlling a movement of said table in X-axis and Y-axis directions;

a pair of wire electrode guides respectively located at a top and a bottom of said workpiece;

taper control means for controlling a slant of said wire electrode relative to said workpiece by moving one of said wire electrode guides in U-axis and V-axis directions;

discharge position detecting means for detecting the discharge position between said wire electrode and said workpiece based on a current supplied through an upper power supplying line and a lower power supplying line from said machining power source to said wire electrode;

means for measuring said discharge position, for a prescribed time period, detected by said discharge position detecting means while moving said wire electrode toward said workpiece;

a counting means for equally dividing a thickness of said workpiece into a number specified in a predetermined program and counting a number of times of discharge at each of the divided parts of said workpiece; and a correcting amount computing means for calculating a correcting amount for correcting the slant of said wire electrode relative to said workpiece based on the number of times of discharge at each of the divided parts of said workpiece counted by said counting means, the thickness of said workpiece and said discharge position detected by said discharge position detecting means.

5. A wire electrode discharge machine as claimed in any one of claims 1, 3 and 4, further comprising:

discharge position storage means for moving said pair of wire electrode guides in the U-axis and V-axis directions to slant said wire electrode so as to generate the discharge between said wire electrode and said workpiece, and storing the discharge position detected by said discharge position detecting means; and workpiece thickness computing means for calculating a thickness of said workpiece based on the discharge position stored in said discharge position storage means.

6. A wire electrode discharge machine as claimed in any one of claims 1, 3 and 4, further comprising:

a discharge position detecting power source, for contour machining, for supplying less power for a lesser amount of machining per unit time compared with said machining power source.

7. A wire electrode discharge machine as claimed in any one of claims 1, 3 and 4, further comprising:

working fluid supplying means for discharge position detection for supplying a working fluid for discharge position detection between said wire electrode and said workpiece in detecting the discharge position by said discharge position detecting means.

8. A wire electrode discharge machine as claimed in any one of claims 3 and 4, further comprising:

an irregular discharge detecting means for detecting a concentrated discharge as an irregular discharge if the concentrated discharge is generated in detecting the discharge position by said discharge position detecting means; and a correcting amount excluding means for excluding the irregular discharge from the correcting amount calculated by said correction amount computing means when the irregular discharge is detected by said irregular discharge detecting means.

9. A wire electrode discharge method, comprising the steps of:

applying voltage, using a machining power source, to generate a discharge through working fluid supplied between a wire electrode and a workpiece;

controlling a movement, in an X-axis direction and a Y-axis direction, of a table for holding said workpiece;

controlling a slant of said wire electrode relative to said workpiece by moving, in a U-axis direction and a V-axis direction, one of a pair of wire electrode guides respectively located at a top and a bottom of said workpiece;

detecting a discharge position between said wire electrode and said workpiece based on a current supplied through an upper power supplying line and a lower power supplying line from said machining power source to said wire electrode;

determining a slant direction of said wire electrode relative to said workpiece based on a shift of said discharge position while moving said wire electrode toward said workpiece; and correcting the slant of said wire electrode relative to said workpiece based on the slant direction of said wire electrode.

10. A wire electrode discharge method, comprising the steps of:

applying voltage, using a machining power source, to generate a discharge through working fluid supplied between a wire electrode and a workpiece;

controlling a movement, in an X-axis direction and a Y-axis direction, of a table for holding said workpiece;

controlling a slant of said wire electrode relative to said workpiece by moving, in a U-axis direction and a V-axis direction, one of a pair of wire electrode guides respectively located at a top and a bottom of said workpiece;

detecting a discharge position between said wire electrode and said workpiece based on a current supplied through an upper power supplying line and a lower power supplying line from said machining power source to said wire electrode;

measuring said discharge position for a prescribed time period while moving said wire electrode toward said workpiece;

calculating a distance between an upper end and a lower end of said discharge position as a discharge width in a thickness direction of said workpiece; and calculating a correcting amount for correcting the slant of said wire electrode relative to said workpiece based on said discharge width, a thickness of said workpiece and said discharge position.

11. A wire electrode discharge method, comprising the steps of:

applying voltage, using a machining power source, to generate a discharge through working fluid supplied between a wire electrode and a workpiece;

controlling a movement, in an X-axis direction and a Y-axis direction, of a table for holding said workpiece;

controlling a slant of said wire electrode relative to said workpiece by moving, in a U-axis direction and a V-axis direction, one of a pair of wire electrode guides respectively located at a top and a bottom of said workpiece;

detecting a discharge position between said wire electrode and said workpiece based on a current supplied through an upper power supplying line and a lower power supplying line from said machining power source to said wire electrode;

measuring said discharge position for a prescribed time period while moving said wire electrode toward said workpiece;

equally dividing a thickness of said workpiece into a number specified in a predetermined program and counting a number of times of discharge at each of the divided parts of said workpiece; and calculating a correcting amount for correcting the slant of said wire electrode relative to said workpiece based on the number of times of discharge at each of the divided parts of said workpiece, the thickness of said workpiece and said discharge position.

12. A wire electrode discharge method as claimed in any one of claims 9, 10 and 11, further comprising the steps of:

moving said pair of wire electrode guides in the U-axis and V-axis directions to slant said wire electrode so as to generate the discharge between said wire electrode and said workpiece, and storing the discharge position; and calculating a thickness of said workpiece based on the discharge position.

13. A wire electrode discharge method as claimed in any one of claims 9, 10 and 11, further comprising the steps of:

detecting a concentrated discharge as an irregular discharge if the concentrated discharge is generated while detecting the discharge position; and excluding the irregular discharge from the correcting amount when the irregular discharge is detected.

14. A wire electrode discharge method, comprising the steps of:

applying voltage, using a machining power source, to generate a discharge through working fluid supplied between a wire electrode and a workpiece to be machined;

controlling a movement, in an X-axis direction and a Y-axis direction, of a table for holding said workpiece to be machined;

controlling a slant of said wire electrode relative to said workpiece to be machined by moving, in a U-axis direction and a V-axis direction, one of a pair of wire electrode guides respectively located at a top and a bottom of said workpiece to be machined;

detecting a discharge position between said wire electrode and said workpiece to be machined based on a current supplied through an upper power supplying line and a lower power supplying line from said machining power source to said wire electrode;

calculating the slant of said wire electrode to each of a plurality of workpieces based on the discharge position;

calculating correcting amounts for correcting the slants of said wire electrode relative to each of said plurality of said workpieces based on the slants of said wire electrode to each of said plurality of workpieces;

storing the correcting amounts; and continuing machining said workpiece to be machined by recalling one of the correcting amounts corresponding to said workpiece to be machined while executing a prescribed program.

15. A wire electrode discharge machine, comprising:

working fluid supplying means for supplying working fluid between a wire electrode and a workpiece;

a machining power source for applying a voltage to generate a discharge between said wire electrode and said workpiece through said working fluid supplied from said working fluid supplying means;

a table on which said workpiece is fixed;

table control means for controlling a movement of said table in X-axis and Y-axis directions;

a pair of wire electrode guides respectively located at a top and a bottom of said workpiece;

taper control means for controlling a slant of said wire electrode relative to said workpiece by moving one of said pair of wire electrode guides in U-axis and V-axis directions;

discharge position detecting means for detecting a discharge position between said wire electrode and said workpiece based on a current supplied through an upper power supplying line and a lower power supplying line from said machining power source to said wire electrode;

discharge width computing means for calculating a discharge width based on an amount the discharge position shifts in the X-axis and Y-axis directions detected by said discharge position detecting means at fixed time intervals;

a discharge width storage means for storing said discharge width calculated by said discharge width computing means;

an amount of variation computing means for calculating an amount of variation of the discharge width calculated by said discharge width computing means; and a wire electrode slant computing means for calculating the slant of said wire electrode based on the shifting amount of the discharge position in the X-axis and Y-axis directions detected by said discharge position detecting means until the amount of variation becomes zero after a first discharge is generated.

16. A wire electrode discharge method, comprising the steps of:

applying voltage, using a machining power source, to generate a discharge through working fluid supplied between a wire electrode and a workpiece;

controlling a movement, in an X-axis direction and a Y-axis direction, of a table for holding said workpiece;

controlling a slant of said wire electrode relative to said workpiece by moving, in a U-axis direction and a V-axis direction, one of a pair of wire electrode guides respectively located at a top and a bottom of said workpiece;

detecting a discharge position between said wire electrode and said workpiece based on a current supplied through an upper power supplying line and a lower power supplying line from said machining power source to said wire electrode;

calculating a discharge width based on an amount the discharge position shifts in the X-axis and Y-axis directions at fixed time intervals;

storing said discharge width;

calculating an amount of variation of the discharge width; and calculating the slant of said wire electrode based on the shifting amount of the discharge position in the X-axis and Y-axis directions until the amount of variation becomes zero after a first discharge is generated.

17. A wire electrode discharge machine, comprising:

working fluid supplying means for supplying working fluid between a wire electrode and a workpiece;

a machining power source for applying a voltage to generate a discharge between said wire electrode and said workpiece through said working fluid supplied from said working fluid supplying means;

a table on which said workpiece is fixed;

table control means for controlling a movement of said table in X-axis and Y-axis directions;

a pair of wire electrode guides respectively located at a top and a bottom of said workpiece;

taper control means for controlling a slant of said wire electrode relative to said workpiece by moving one of said pair of wire electrode guides in U-axis and V-axis directions;

discharge position detecting means for detecting a discharge position between said wire electrode and said workpiece based on a current supplied through an upper power supplying line and a lower power supplying line from said machining power source to said wire electrode;

discharge width computing means for moving said wire electrode guide in the U-axis and V-axis directions while carrying out a machining for contour of said workpiece by moving said table in the X-axis and Y-axis directions, and calculating with amount of variation of the discharge width based on the amount the discharge position shifts in the U-axis and V-axis directions detected by said discharge position detecting means at fixed time intervals; and a wire electrode slant computing means for calculating the slant of said wire electrode where the amount of variation of the discharge width calculated by said discharge width computing means is minimum.

18. A wire electrode discharge method, comprising the steps of:

applying voltage, using a machining power source, to generate a discharge through working fluid supplied between a wire electrode and a workpiece;

controlling a movement, in an X-axis direction and a Y-axis direction, of a table for fixing said workpiece;

controlling a slant of said wire electrode relative to said workpiece by moving, in a U-axis direction and a V-axis direction, one of a pair of wire electrode guides respectively located at a top and a bottom of said workpiece;

detecting a discharge position between said wire electrode and said workpiece based on a current supplied through an upper power supplying line and a lower power supplying line from said machining power source to said wire electrode;

moving said wire electrode guide in the U-axis and V-axis directions while carrying out a machining for contour of said workpiece by moving said table in the X-axis and Y-axis directions, and calculating an amount of variation of a discharge width based on an amount the discharge position shifts in the U-axis and V-axis directions at fixed time intervals; and calculating the slant of said wire electrode where the amount of variation of the discharge width is minimum.

19. A wire electrode discharge machine, comprising:

working fluid supplying means for supplying working fluid between a wire electrode and a workpiece;

a machining power source for applying a voltage to generate a discharge between said wire electrode and said workpiece through said working fluid supplied from said working fluid supplying means;

a table on which said workpiece is fixed;

table control means for controlling a movement of said table in X-axis and Y-axis directions;

a pair of wire electrode guides respectively located at a top and a bottom of said workpiece;

taper control means for controlling a slant of said wire electrode relative to said pair of workpiece by moving one of said wire electrode guides in U-axis and V-axis directions;

discharge position detecting means for detecting a discharge position between said wire electrode and said workpiece based on a current supplied through an upper power supplying line and a lower power supplying line from said machining power source to said wire electrode; and correcting amount computing means for calculating a correcting amount for correcting the slant of said wire electrode relative to said workpiece based on a shift of the discharge position, while performing approach machining, which is a shape machining for said workpiece, until said wire electrode reaches a product contour.

20. A wire electrode discharge method, comprising the steps of:

applying voltage, using a machining power source, to generate a discharge through working fluid supplied between a wire electrode and a workpiece;

controlling a movement, in an X-axis direction and a Y-axis direction, of a table for fixing said workpiece;

controlling a slant of said wire electrode relative to said workpiece by moving, in a U-axis direction and a V-axis direction, one of a pair of wire electrode guides respectively located at a top and a bottom of said workpiece;

detecting a discharge position between said wire electrode and said workpiece based on a current supplied through an upper power supplying line and a lower power supplying line from said machining power source to said wire electrode; and calculating a correcting amount for correcting the slant of said wire electrode relative to said workpiece based on a shift of the discharge position, while performing approach machining, which is a shape machining for said workpiece, until said wire electrode reaches a product contour.

21. A wire electrode discharge machine, comprising:

working fluid supplying means for supplying working fluid between a wire electrode and a workpiece to be machined;

a machining power source for applying a voltage to generate a discharge between said wire electrode and said workpiece to be machined through said working fluid supplied from said working fluid supplying means;

a table on which said workpiece to be machined is fixed;

table control means for controlling a movement of said table in X-axis and Y-axis directions;

a pair of wire electrode guides respectively located at a top and a bottom of said workpiece to be machined;

taper control means for controlling a slant of said wire electrode relative to said workpiece to be machined by moving one of said pair of wire electrode guides in U-axis and V-axis directions;

discharge position detecting means for detecting a discharge position between said wire electrode and said workpiece to be machined based on a current supplied through an upper power supplying line and a lower power supplying line from said machining power source to said wire electrode;

wire electrode slant computing means for calculating the slant of said wire electrode to each of a plurality of workpieces based on the discharge position detected by said discharge position detecting means;

correcting amount computing means for calculating correcting amounts for correcting the slants of said wire electrode relative to each of said plurality of workpieces based on the slant of said wire electrode to each of said plurality of said workpieces calculated by said wire electrode slant computing means;

correcting amount storage means for storing the correcting amounts calculated by said correcting amount computing means; and machining continuing means for continuing machining of said workpiece to be machined by recalling one of the correcting amounts stored in said correcting amount storage means corresponding to said workpiece to be machined while executing a prescribed program.

* * * * *